(12) United States Patent
Tidwell

(10) Patent No.: US 7,328,681 B2
(45) Date of Patent: Feb. 12, 2008

(54) V-ROLLER BEARING AND ENGINE

(75) Inventor: Rodney Tidwell, Woodville, AL (US)

(73) Assignee: VRB, L.L.C., Toney, AL (US)

( * ) Notice: Subject to any disclaimer, the term of this patent is extended or adjusted under 35 U.S.C. 154(b) by 0 days.

(21) Appl. No.: 11/343,002

(22) Filed: Jan. 30, 2006

(65) Prior Publication Data

US 2006/0104556 A1 May 18, 2006

Related U.S. Application Data

(60) Provisional application No. 60/647,862, filed on Jan. 28, 2005.

(51) Int. Cl.
*F16C 33/06* (2006.01)
(52) U.S. Cl. .................. 123/195 R; 384/294; 384/432
(58) Field of Classification Search ............ 123/195 R, 123/192.1, 197.4; 384/432, 429, 278, 294
See application file for complete search history.

(56) References Cited

U.S. PATENT DOCUMENTS

| | | | | |
|---|---|---|---|---|
| 2,729,521 | A * | 1/1956 | Maybach et al. ........... | 384/294 |
| 2,821,444 | A * | 1/1958 | Brown ........................ | 384/432 |
| 5,039,230 | A | 8/1991 | Phillips et al. | |
| 7,147,926 | B2 * | 12/2006 | Mickelson et al. .......... | 428/457 |
| 2004/0175064 | A1* | 9/2004 | Damour ...................... | 384/294 |
| 2004/0240758 | A1* | 12/2004 | Heuberger et al. .......... | 384/294 |
| 2005/0223546 | A1 | 10/2005 | Klier et al. | |
| 2006/0274982 | A1* | 12/2006 | Welch et al. ............... | 384/294 |

* cited by examiner

*Primary Examiner*—Stephen K. Cronin
*Assistant Examiner*—Jason Benton
(74) *Attorney, Agent, or Firm*—Lanier Ford Shaver & Payne P.C.; Ann I. Dennen

(57) ABSTRACT

A bearing has an inner race that has separable inner sections. The inner race has an inner male protrusion and an inner female receptacle, and each inner male protrusion is mated with one of the inner female receptacles to form a unitary inner race. The bearing further has an outer race that has separable outer sections. The outer race has an outer male protrusion and an outer female receptacle, and each outer male protrusion is mated with one of the outer female receptacles to form a unitary outer race. Further, the bearing has a plurality of rollers situated within a channel formed by engaging the inner race and the outer race.

13 Claims, 21 Drawing Sheets

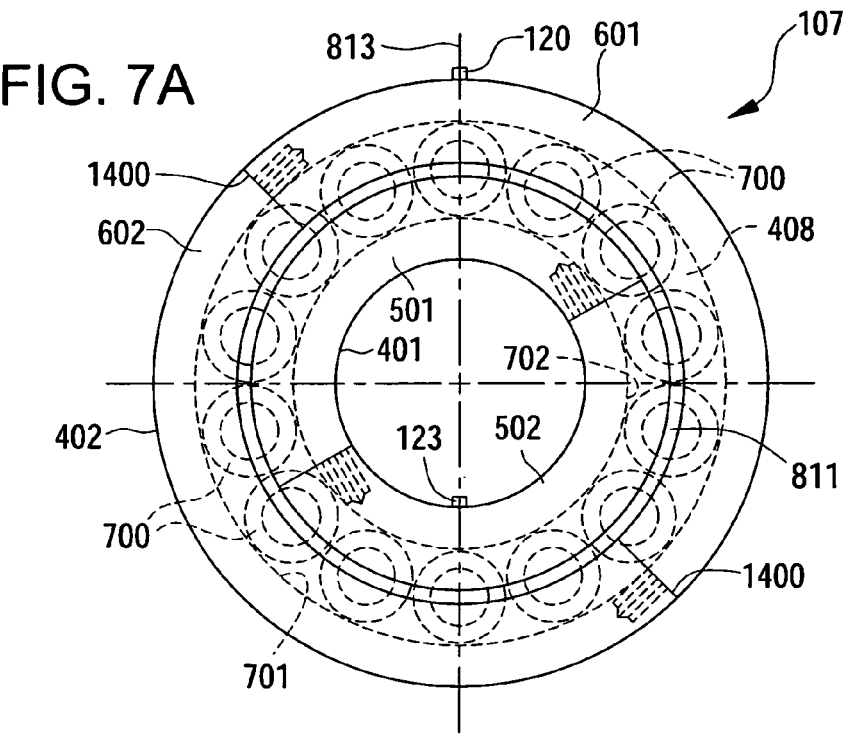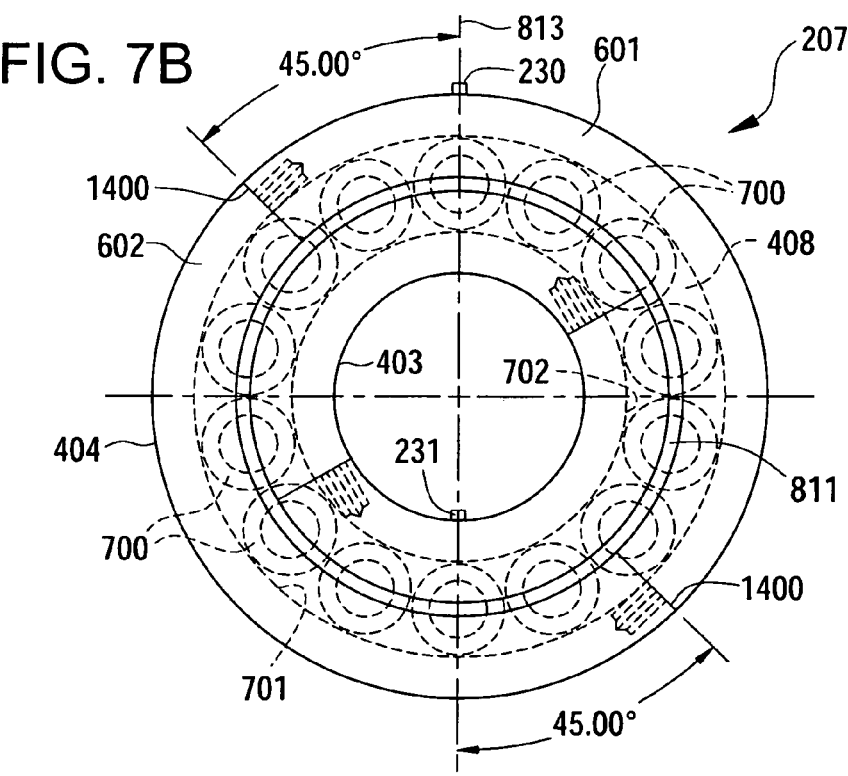

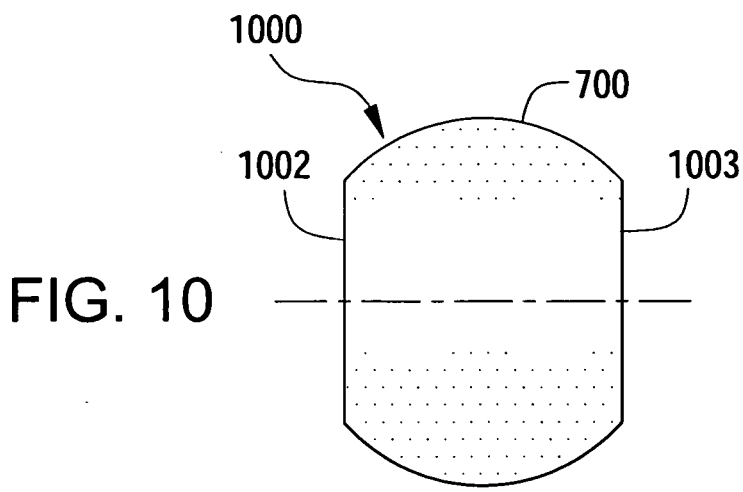
FIG. 10
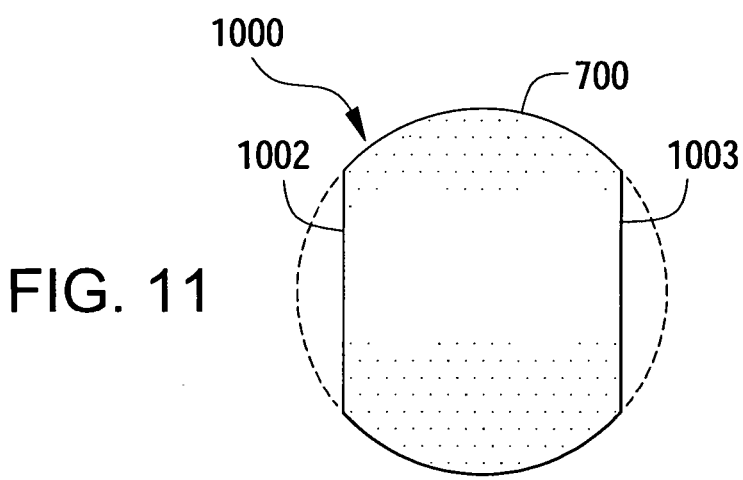
FIG. 11
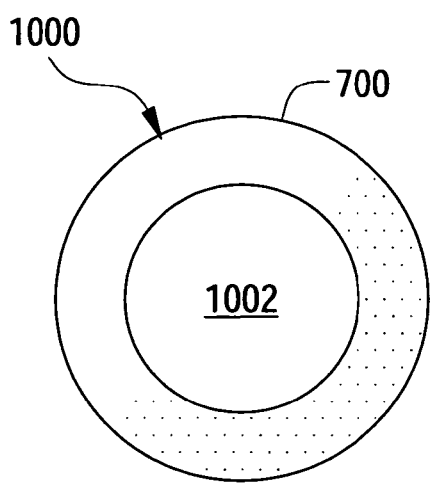 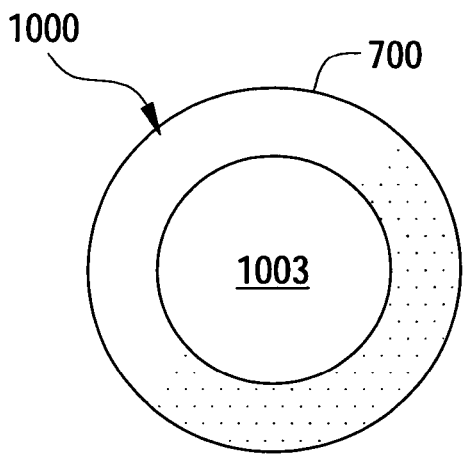
FIG. 12      FIG. 13

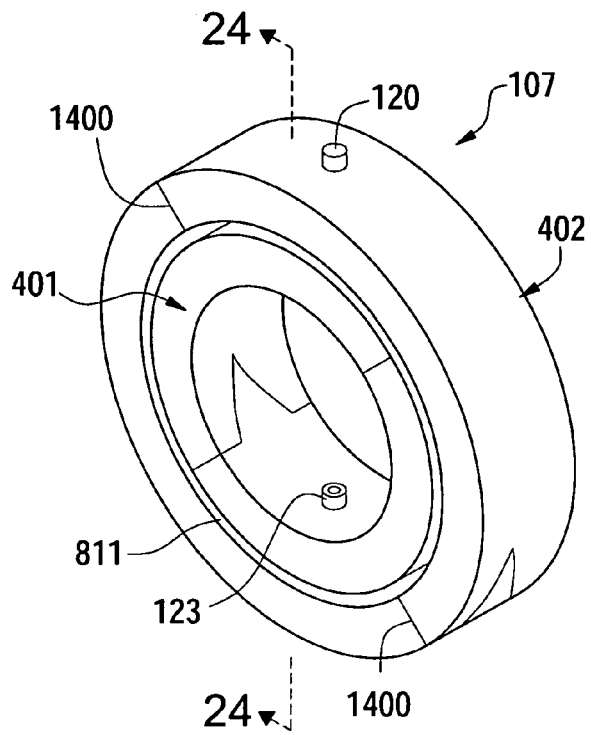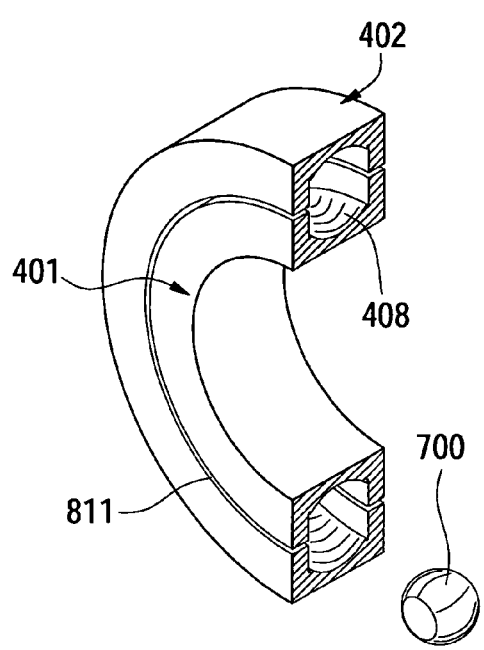
FIG. 23　　FIG. 24
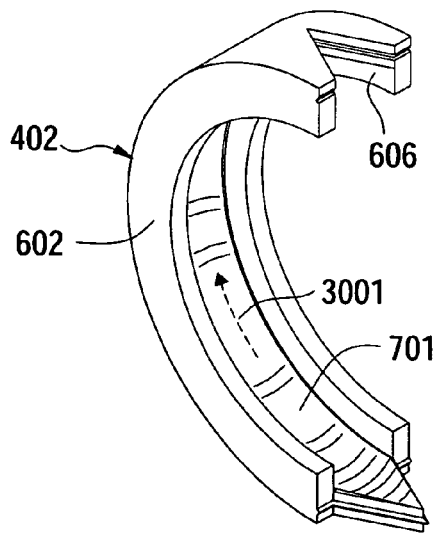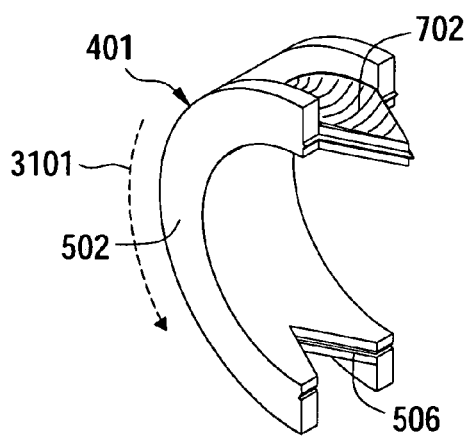
FIG. 25　　FIG. 26

V-ROLLER BEARING AND ENGINE

CROSS REFERENCE TO RELATED APPLICATIONS

This application claims priority to U.S. Provisional Application No. 60/647,862, entitled "V-Roller Bearing Apparatus and Method" and filed on Jan. 28, 2005, which is incorporated herein by reference.

BACKGROUND

Typically, a vehicle engine comprises a crankshaft that converts the up and down motion of a plurality of pistons into rotary motion. Such rotary motion produced provides turning motion for effecting mechanical movement, e.g., movement of the wheels of a vehicle.

The crankshaft is usually either alloy steel or cast iron, and it is connected to the plurality of pistons by connecting rods. Typically, these connecting rods are mechanically attached to rod bearings that enable minimal friction movement about rod journals. Furthermore, the crankshaft often comprises a plurality of main bearings along a centerline of the crankshaft on the main journals. These main bearings enable minimal friction rotary movement about the crankshaft rod, and the main bearings hold the crankshaft in place during operation.

There are many types of bearings that are used in a plurality of applications. For example, there are ball bearings, roller bearings, ball thrust bearings, roller thrust bearings and tapered roller thrust bearings. However, roller bearings are not typically used in a car engine.

Typical automobile engines are limited on revolutions per minute due to friction caused by a variety of components, including the bearings that are used for the main journal and the rod journals on the crankshaft. However, a typical engine uses bushings for the rod bearings and the main bearings. A bushing is a metal to metal lining used to reduce friction, and oil is pumped into the engine to the bushings through oil galleys to lubricate such bushings.

SUMMARY OF THE DISCLOSURE

Generally, the present disclosure provides a bearing for use in an engine.

A bearing in accordance with an embodiment of the present disclosure comprises an inner race having separable inner sections, each inner section comprising an inner male protrusion and an inner female receptacle, each inner male protrusion mated with one of the inner female receptacles forming a unitary inner race. The bearing further comprises an outer race having separable outer sections, each outer section comprising an outer male protrusion and an outer female receptacle, each outer male protrusion mated with one of the outer female receptacles forming a unitary outer race and a plurality of rollers situated within a channel formed by engaging the inner race and the outer race.

An engine in accordance with an exemplary embodiment of the present disclosure comprises a crankshaft having a plurality of main journals and a plurality of rod journals, a plurality of main roller bearings engage each main journals, and a plurality of rod roller bearings engage each rod journal.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 7A is a cross sectional plan view of an assembled main bearing as depicted in FIG. 4.

FIG. 7B is a cross sectional plan view of an assembled rod bearing as depicted in FIG. 4.

FIG. 10 depicts a side plan view of a roller in accordance with an embodiment of the present disclosure for use in the main bearing depicted in FIG. 4.

FIG. 11 depicts a top plan view of the roller depicted in FIG. 10.

FIG. 12 depicts a first end plan view of the roller depicted in FIG. 10.

FIG. 13 depicts a second end plan view of the roller depicted in FIG. 10.

FIG. 23 depicts a perspective view of an assembled main bearing as depicted in FIG. 4.

FIG. 24 depicts a perspective view of a portion of the channel of the assembled main bearing as depicted in FIG. 23.

FIG. 25 depicts a perspective view of a section of an outer race of the of the assembled main bearing as depicted in FIG. 23.

FIG. 26 depicts a perspective view of a section of an inner race of the of the assembled main bearing as depicted in FIG. 23.

DETAILED DESCRIPTION

Generally, a bearing of the present disclosure pertains to a mechanical engine, and the present disclosure describes a bearing in the context of an automobile engine. However, such bearings may also be employed in engines implemented in any other type of vehicle, appliance, or other device using an engine to operate.

A bearing in accordance with the present disclosure may be employed in an engine as a main bearing and/or a rod bearing. In particular, a bearing in accordance with the present disclosure is a roller bearing that engages the main journal or rod journal in an engine.

Figure 1:
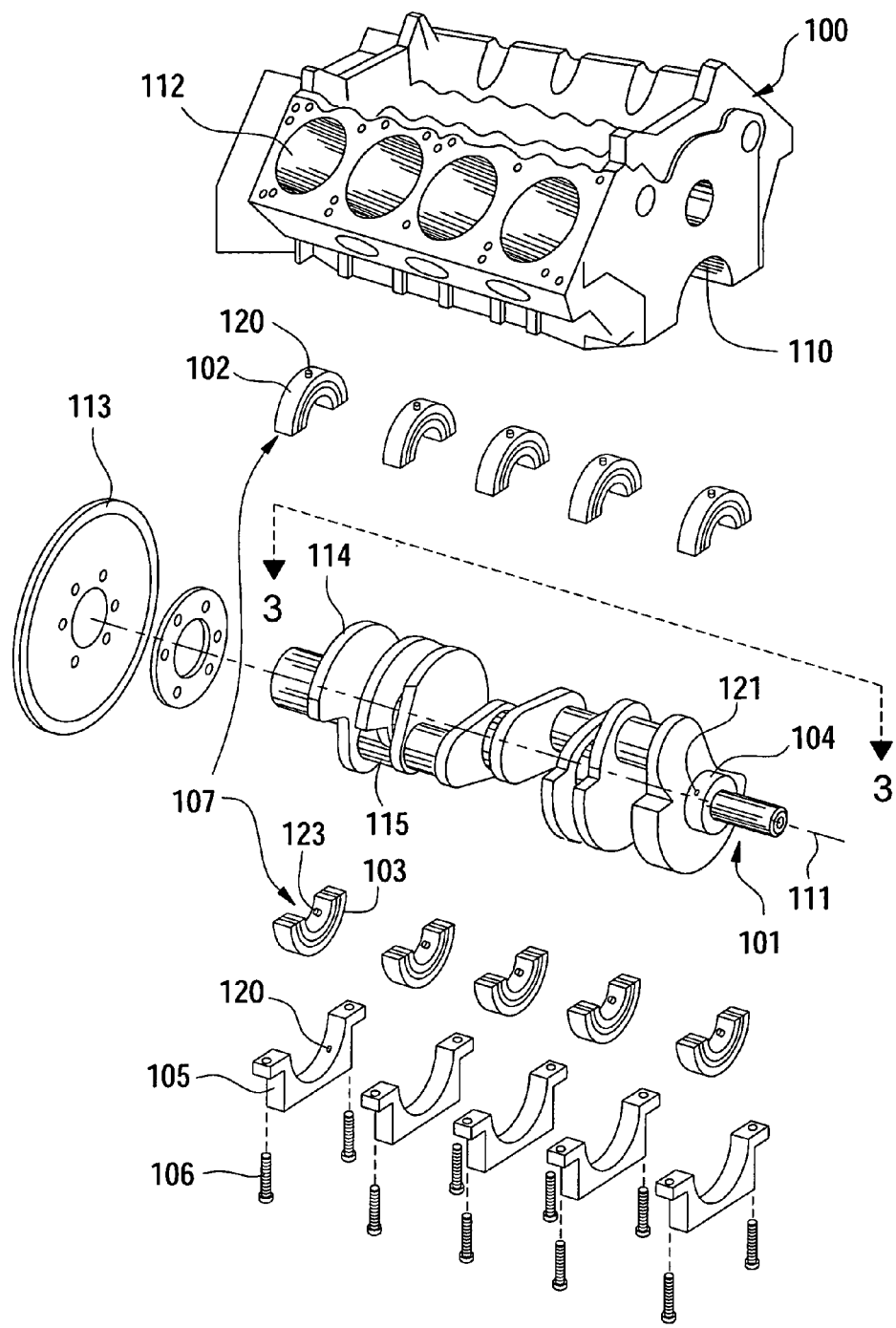
FIG. 1 is an exploded perspective view of an engine block and a crankshaft assembly having a main bearing in accordance with an embodiment of the present disclosure.

FIG. 1 depicts an engine block 100 and an exploded view of a crankshaft assembly comprising a crankshaft 101, a plurality of main bearings 107 in accordance with an exemplary embodiment of the present disclosure, and main bearing caps 105. Each main bearing 107 comprises sections 102 and 103 and at least one lock and alignment pin 120 and/or 123, which is described further herein.

The crankshaft 101 comprises a plurality of main journals 104 and a plurality of counter weights 114. Each main bearing 107 fits about one of the main journals 104. In this regard, the first section 102 locks and aligns within a recess 110 in the engine block 100, which is described further herein.

The crankshaft 101 is inserted into the recess 110 such that each main journal 104 rests within the inserted section 102 of the main bearings 107. The second section 103 of each main bearing 107 is connected, via the main bearing caps 105 and the screws 106 to the engine block 100. When connected to the engine block 100, the first and second sections 102 and 103, respectively, are assembled thereby creating a friction-reducing insert between the engine block 100 and the main journal 104.

Each main bearing 107 is preferably locked and aligned relative to the engine block 100 and/or the main journal 104. In this regard, the main bearing 107 may be locked and aligned by inserting the lock and alignment pin 120 in a recess (not shown) in the engine block 100. In one embodiment, the recess may be formed by the oil galley (not shown), which is known to those having ordinary skill in the art. Note that the oil galley is an extensive network of galleys that runs from the engine block 100 through the crankshaft 101, such that oil is delivered to each main journal 104 and each rod journal 115. Thus, each of the bearings 107 and 207 receive such oil from the galleys through the journals 104 and 115, respectively, and the engine block 100.

Further, the main bearing 107 may be locked and aligned by inserting the lock an alignment pin 123 in a recess 121 formed on the main journal 104. Substantially similar to the alignment pin 120, the recess 121 may be formed from the oil galley, as described hereinabove.

As noted, recess 121 on the main journal 104 may be an oil inlet from which oil flows in order to lubricate the main journal 104. The lock and alignment pin 123 may be inserted into the oil inlet and comprise an opening through which oil could continue to flow to the main journal 104 and the main bearing 107. Note that the oil inlet from which the oil is delivered from the oil galleys may be machined in order to allow a sufficient diameter through which the pin 123 could be inserted. Likewise, the engine block 100 may be machined in order to allow pin 120 sufficient diameter through which the pin 120 could be inserted.

Lock and alignment of the main bearings 107 are described further herein. Note that describing the recess (not shown) in the engine block 100 and the recess 121 in the main journal 104 is for exemplary purposes. However, such recesses may be formed on other parts of the engine block 100 or the crankshaft 101 in other embodiments. Notably, the recesses need not be formed by the oil galleys and/or oil inlets from which the oil flows.

Figure 2:
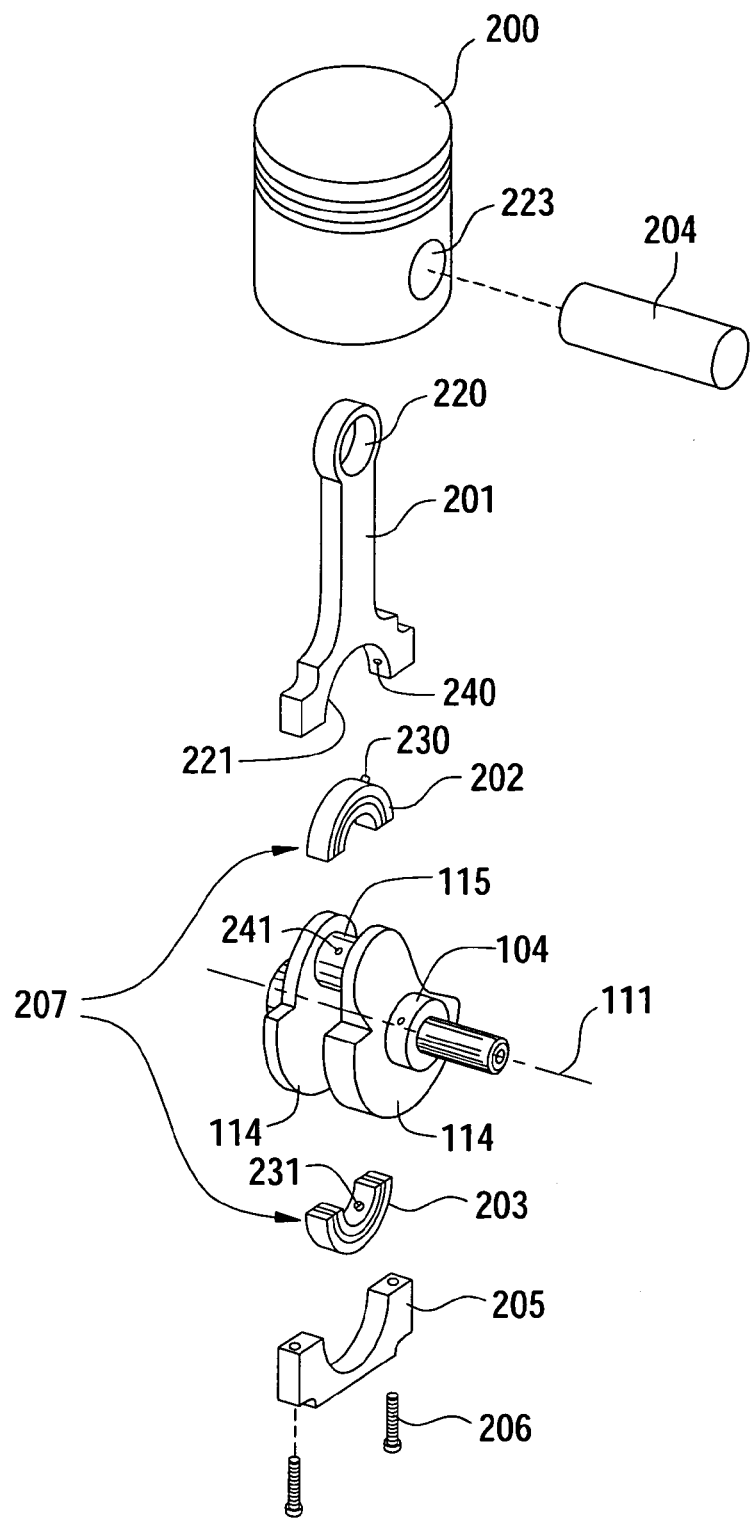
FIG. 2 is an exploded perspective view of a portion of the crankshaft depicted in FIG. 1 further depicting a rod bearing in accordance with an embodiment of the present disclosure.

During operation, a plurality of pistons (not shown), described further with reference to FIG. 2, are positioned within a plurality of cylinders 112. As the pistons move up and down the crankshaft 101 translates the up and down motion of the pistons to rotary motion. Thus, the main journal 104 rotates about the crankshaft center axis 111.

Note that the rotary motion produced by the crankshaft 101 induces rotary motion in other mechanical components, e.g., the flywheel 113, of a vehicle (not shown). However, such intricacies are outside of the scope of this disclosure.

The crankshaft 101 further comprises a plurality of rod journals 115. The rod journals 115 connect a pair of counter weights 114. The rod journals 115 have a center axis offset from the center axis 111 of the main journals 104. Furthermore, each of the rod journals 115 is connected to a piston 200 via a connecting rod, as shown with reference to FIG. 2.

FIG. 2 depicts a portion of the crankshaft 101 depicted in FIG. 1. As described hereinabove, the main journals 104 engage a plurality of main bearings 107 (FIG. 1) in accordance with an embodiment of the present disclosure. In addition, with reference to FIG. 2, the plurality of rod journals 115 engages a plurality of respective rod bearings 207 in accordance with an embodiment of the present disclosure. FIG. 2 depicts such engagement.

FIG. 2 depicts the counter weights 114 connected via the rod journal 115. Each rod bearing 207, similar to the main bearing 107 (FIG. 1), comprises a first section 202 and a second section 203. The first section 202 comprises a lock and alignment pin 230, and section 202 comprises a lock and alignment pin 231.

In this regard, the lock and alignment pin 230 fits in a recess 240 in the connecting rod 201 when assembled. The lock and alignment pin 231 fits in recess 241 in the rod journal 115 when assembled. The first section 202 and the second section 203 of each rod bearing 207 assembles about the rod journal 115 to form a unitary rod bearing 207.

Furthermore, the connecting rod 201 engages the first section 202 such that the section 202 fits within an arch 221 of the connecting rod 201, and a bearing cap 205 is connected to the connecting rod 201 via a plurality of screws 206. When assembled, the first and second sections 202 and 203, respectively, create a friction-reducing insert between the rod journal 115, the connecting rod 201, and the bearing caps 205.

The connecting rod 201 is attached via a piston pin 204 to a piston 200. In this regard, the piston pin 204 fits within a whole 223 in the piston 200 and through an opening 220 in the connecting rod 201, thereby securing the piston 200 to the connecting rod 201.

Note that full assembly of the engine block 100 (FIG. 1) necessarily requires a cylinder head (not shown) bolted to the engine block 100 (FIG. 1) in order to contain the combustion process that occurs within each of the cylinders 112 (FIG. 1). When combustion occurs in the cylinders 112, the pistons 200 move up and down thereby inducing rotary motion in the crankshaft 101, as described hereinabove.

Each rod bearing 207 is preferably locked and aligned relative to the connecting rod 201 and/or the rod journal 115. In this regard, the rod bearing 207 may be locked and aligned by inserting the lock and alignment pin 230 in a recess 240 formed on the connecting rod 201. Further, the rod bearing 207 may be locked and aligned by inserting the lock and alignment pin 231 in a recess 241 formed on the rod journal 115. As noted herein, preferably, the recess 241 is an oil inlet associated with an oil galley (not shown).

In this regard, recess 241 on the rod journal 115 may be an oil inlet from which oil flows in order to lubricate the rod journal 115 and hence the rod bearing 207. The lock and alignment pin 231 may be inserted into such oil inlet, and the lock and alignment pin 231 may comprise an opening through which oil could continue to flow to the rod journal 115 and hence the rod bearings 207.

Lock and alignment of the rod bearings 207 are described further herein. Note that the recesses 240 and 241 are shown on the connecting rod 240 and the rod journal 115 for exemplary purposes. However, such recesses 240 and 241 may be formed on other parts of the engine block 100 or the crankshaft 101 in other embodiments.

During operation, as described hereinabove, the connecting rod 201 moves in an up and down motion. When the connecting rod 201 moves in an up and down motion, it rotates about the rod journal 115. However, the rod bearing 207 ensures a friction-reduced movement as described further herein.

Figure 3:
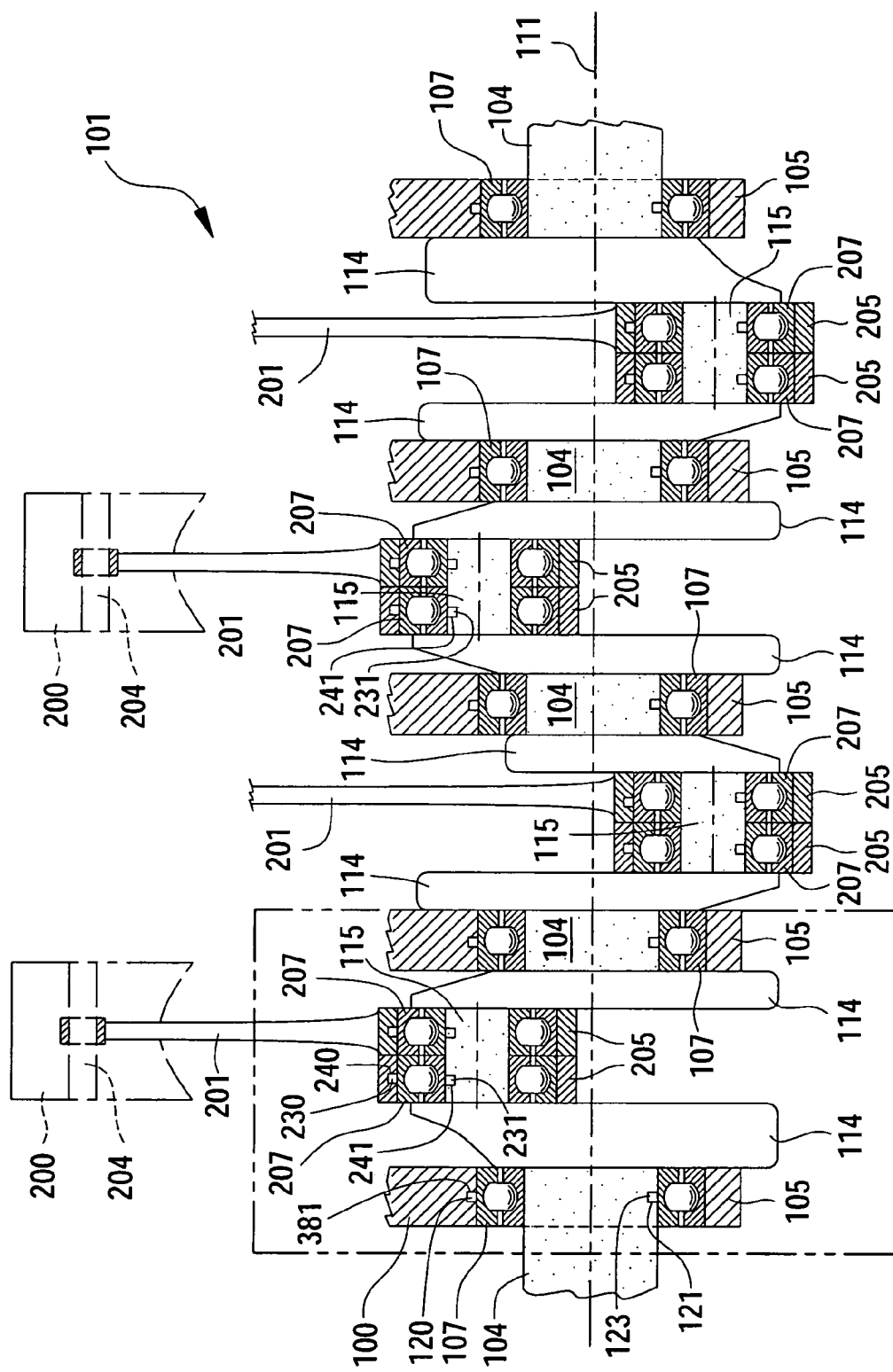
FIG. 3 is a cross sectional plan view of the crankshaft assembly depicted in FIG. 1.

FIG. 3 depicts a cross-sectional view of the crankshaft 101 depicted in FIG. 1 illustrating a plurality of main bearings 107 and further comprising a plurality of rod bearings 207. Such crankshaft 101 is typical for a V-8 engine, however, the present disclosure is not limited to V-8 engines. In this regard, other types of engines are possible in other embodiments.

As indicated hereinabove, each rod bearing 207 is connected to a connecting rod 201, for example via a bolt cap 205, as described herein with reference to FIG. 2. In turn, each of the connecting rods 201 is connected to a respective piston 200, as described herein with reference to FIG. 2. Each rod bearing 207 is secured to a respective rod journal 115 by attaching each bearing cap 205 to each connecting rod 201 via screws 206, as shown with reference to FIG. 2.

FIG. 3 further illustrates the main bearing 107 comprising two lock and alignment pins 120 and 123. The lock and alignment pin 120 is disposed on the outside diameter of the main bearing 107 and engages a recess 381 that is preferably formed in the engine block 100 from an oil inlet, not shown, of an oil galley, not shown.

The lock and alignment pin 123 is disposed on the inside diameter of the main bearing 107 and engages the recess 121 in the rod journal 115. As described hereinabove, the recess 121 may be an oil inlet that that connects to a plurality of oil galleys (not shown) that transports oil throughout the crankshaft 101.

FIG. 3 further illustrates the rod bearing 207 comprising two lock and alignment pins 230 and 231. The lock and alignment pin 230 is disposed on the outside diameter of the rod bearing 207, and preferably engages the recess 240 formed in the connecting rod 201.

The lock and alignment pin 231 is disposed on the inside diameter of the rod bearing 207 and engages the recess 241 in the rod journal 115. As described hereinabove, the recess 241 may be an oil inlet that that connects to a plurality of oil galleys (not shown), which transport oil throughout the crankshaft 101.

As described herein, the crankshaft 101 rotates about the centerline 111 when the pistons 200 move up and down via combustion occurring in each respective cylinder 112 (FIG. 1). When the crankshaft 101 turns about the centerline 111, the main bearings 107 reduce the friction between the main journal 104, the engine block 100, and the bearing caps 105.

Further, as the pistons 200 move up and down, the connecting rods 201 turn about the rod journals 115. The rod bearings 207 reduce the friction between the rod journals 115, the connecting rod 201, and the bearing caps 205.

Figure 4:
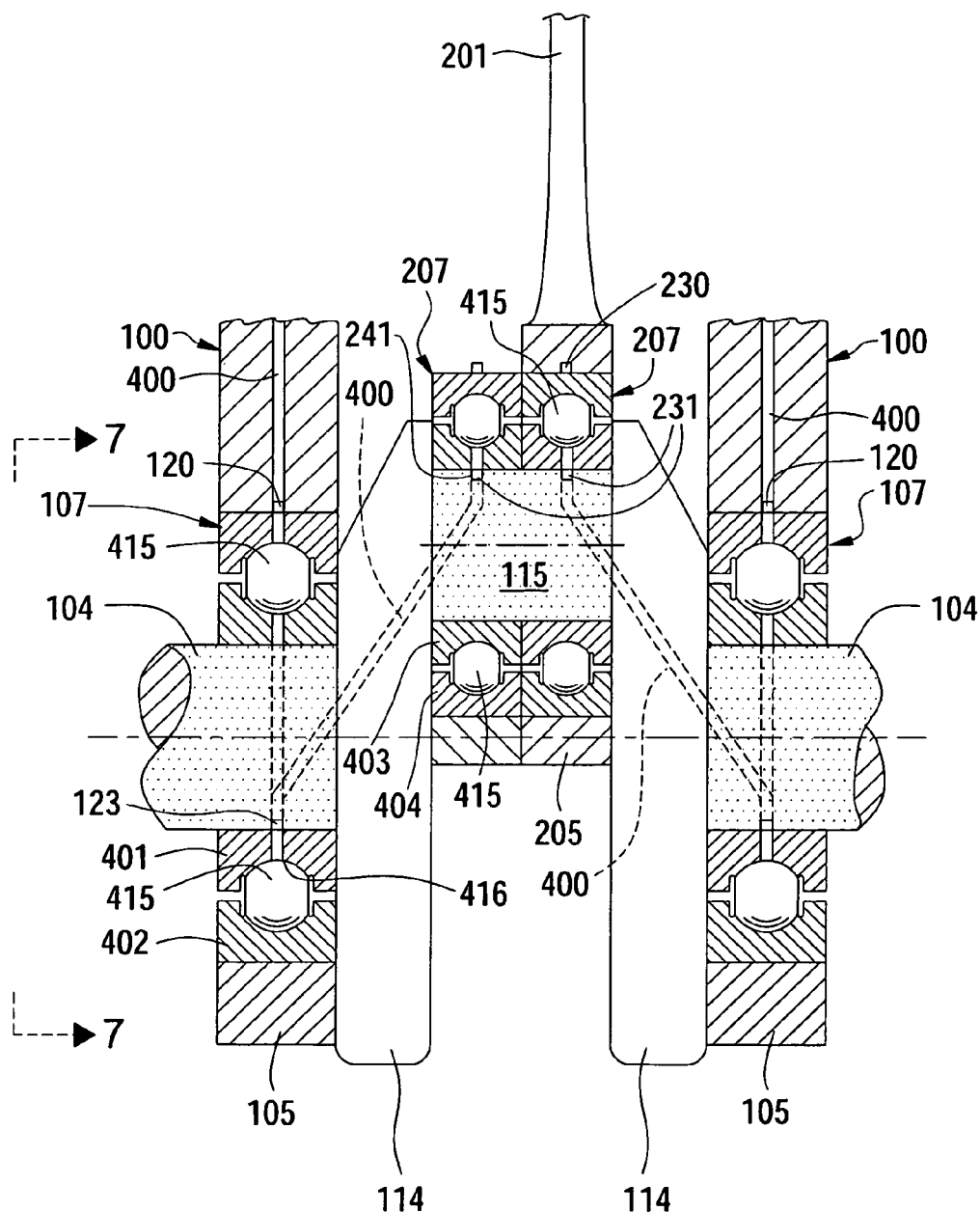
FIG. 4 is a cross sectional plan view of a portion of the crankshaft assembly depicted in FIG. 1.

FIG. 4 depicts a cross-sectional view of a section of the crankshaft 101 depicted in FIG. 3, as indicated. The section shown comprises bearings 107 that are assembled about the main journal 104 in accordance with an embodiment of the present disclosure. The section further depicts one connecting rod 201, which is connected to the piston 200 as depicted in FIG. 2. The connecting rod 201 is connected to the rod bearing 207 via screws 206 and a bearing cap 205 as depicted in FIG. 2.

As the pistons 200 (FIG. 2) move up and down, the movement induces rotary motion of the main journal 104 such that the main journal 104 rotates within the engine block 100. Further, the up and down motion of the pistons 200 up and down motion in the connecting rod 201 such that the connecting rod 201 rotates about the rod journal 115 due to the counter weights 114.

Each of the bearings 107 and 207 are roller bearings, e.g., use rollers to effect uninhibited movement of the bearings, in accordance with an embodiment of the present disclosure. The bearings 107 and 207 each reduce the friction caused by the rotary motion of the crankshaft 101 and the up and down motion of the pistons 200 (FIG. 2).

FIG. 4 further depicts an oil galley 400. The oil galley 400 carries oil to the moving parts of the crankshaft 101. The main bearings 107 and the roller bearings 207 use the oil to further reduce friction that occurs when operating. The use of the oil by the main bearings 107 and the rod bearings 207 in accordance with an embodiment of the present disclosure is described in more detail herein.

As described herein with reference to FIG. 3, the main bearing 107 may further comprise the lock and alignment pins 120 and 123 that lock and align with the engine block 100 and the main journal 104. FIG. 4 depicts the lock and alignment pin 123 disposed on the inner diameter of the bearing 107 as interfacing with the oil galley 400. In this regard, the pin 123 may comprise an opening through which oil may continue to flow to the bearing 107, and the lock and alignment pin 123 fits snugly within the oil galley 400.

As described herein with reference to FIG. 3, the rod bearing 207 may further comprise the lock and alignment pins 230 and 231 that lock and align with the connecting rod 201 and the rod journal 115. FIG. 4 depicts the lock and alignment pin 231 disposed on the inner diameter of the bearing 207 as interfacing with the oil galley 400. In this regard, the pin 231 may comprise an opening (not shown) through which oil may continue to flow to the bearing 207, and the lock and alignment pin 231 fits snugly within the oil galley 400.

Each bearing 107 and 207 comprises an inner race 401 and 403, respectively, and an outer race 402 and 404, respectively. In this regard, each of the inner races 401 and 403 are rigidly affixed to the main journal 104 and/or the rod journal 115, respectively. Furthermore, each outer race 402 and 404 is rigidly connected to the engine block 100 and the connecting rod 201, respectively.

For simplicity, a main bearing 107 in accordance with an embodiment of the present disclosure is now described in more detail. Preferably, however, each rod bearing 207 and/or each main bearing 107 are substantially similar and in accordance with the following description with reference to the main bearing 107. Notably, however, the size of the bearing may be dictated by the bearing's application. For example, the main bearing 107 may have a larger diameter than that of a rod bearing 207, because the main bearing 107 engages the main journal 104, which may have a larger diameter than the rod journal 115 that the rod bearing 207 engages.

Figure 5:
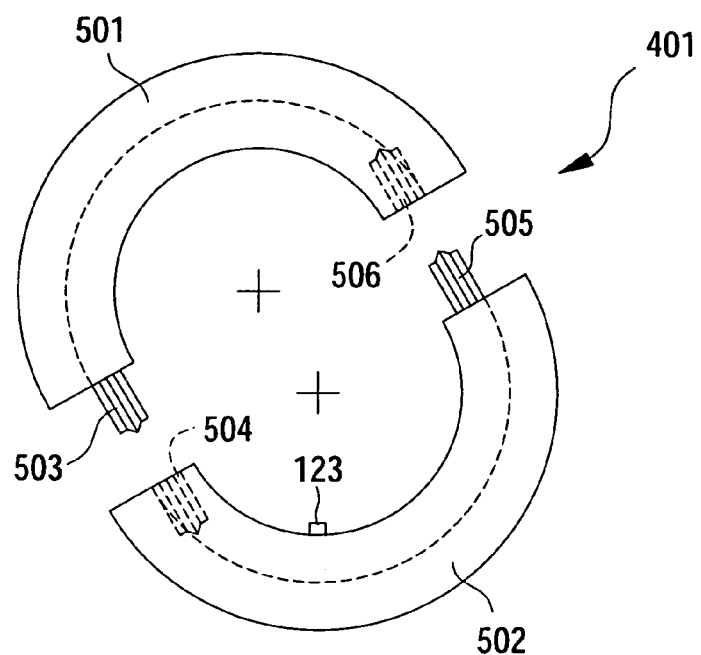
FIG. 5 is a plan view of an inner race of a bearing depicted in FIG. 4 in accordance with an embodiment of the present disclosure.

FIG. 5 depicts a plan view of the inner race 401 of the main bearing 107 depicted in FIG. 4. The inner race 401 in accordance with an exemplary embodiment of the present disclosure comprises two separable sections 501 and 502 unassembled. Each of the sections 501 and 502 comprise a male protrusion 503 and 505, respectively. Further, each of the sections 501 and 502 comprise a female receptacle 506 and 504, respectively.

The first section 501 and the second section 502 are assembled by inserting the male protrusion 503 of the first section 501 into the female receptacle 504 of the second section 502. Further, the first section 501 and the second section 502 are assembled by inserting the male protrusion 505 of the second section 502 into the female receptacle 506 of the first section 501. When the sections 501 and 502 are completely assembled, they form a unitary inner race 401.

In accordance with the present disclosure, each male protrusion 503 and 505 and each corresponding female receptacle 504 and 506 are connected via a tongue and groove mechanism, respectively, which is described in more detail hereafter.

As described hereinabove with reference to FIGS. 3 and 4, the inner race 401 further comprises a lock and alignment pin 123 that aligns the inner race 401 with the main journal 104, as described further herein. In this regard, the lock pin 123 preferably aligns with a corresponding recess 121 (FIG. 3) in the main journal 104 (FIG. 3). Furthermore, as described hereinabove with reference to FIG. 4, the inner race 401, because it is locked and aligned with the main journal 104, rotates in a direction of and at a same speed as the crankshaft 101 (FIG. 2). Furthermore, the lock and alignment pin 123 may comprise an opening (not shown) for interfacing with the oil galley 400 (FIG. 4).

Figure 6:
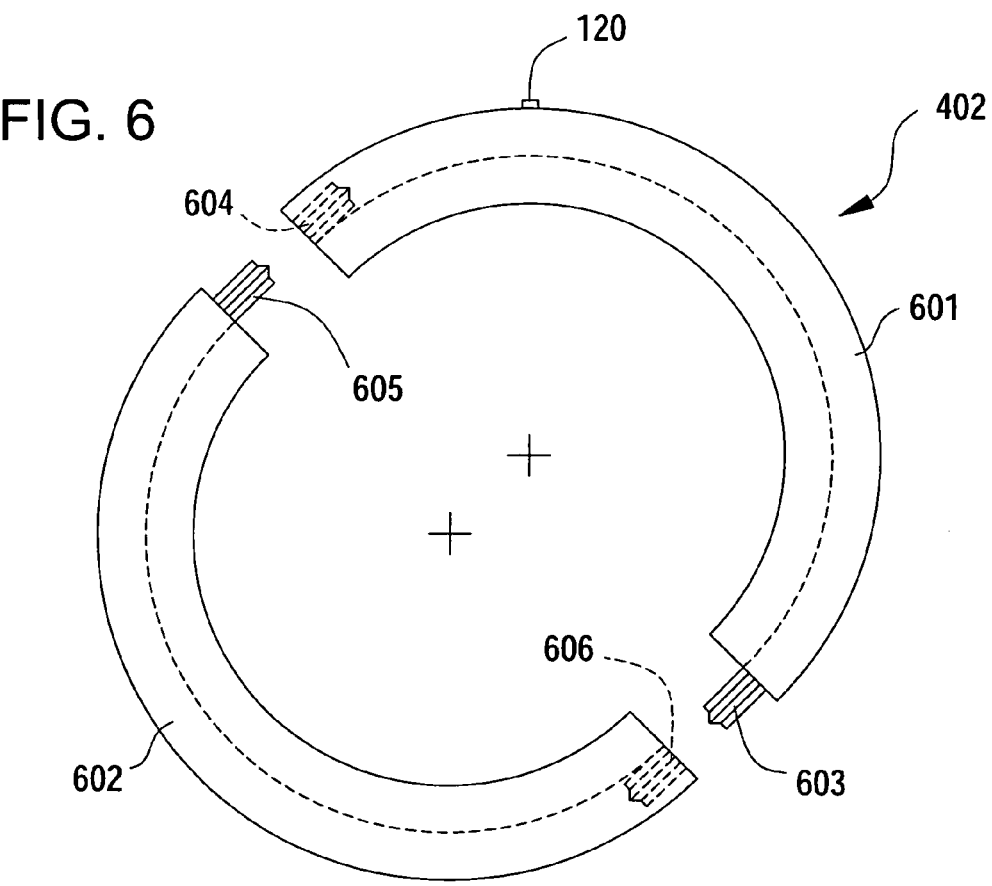
FIG. 6 is a plan view of an outer race of a bearing depicted in FIG. 4 in accordance with an embodiment of the present disclosure.

FIG. 6 depicts an outer race 402 of the main bearing 107 depicted in FIG. 4. The outer race 402 in accordance with an exemplary embodiment of the present disclosure comprises two separable sections 601 and 602 unassembled. Each of the sections 601 and 602 comprise a male protrusion 603 and 605, respectively. Further, each of the sections 601 and 602 comprise a female receptacle 604 and 606, respectively.

The first section 601 and the second section 602 are assembled by inserting the male protrusion 603 of the first section 601 into the female receptacle 606 of the second section 602. Further, the first section 601 and the second section 602 are assembled by inserting the male protrusion 605 of the second section 602 into the female receptacle 604 of the first section 601. When the sections 601 and 602 are completely assembled, they form a unitary outer race 402.

In accordance with the present disclosure, each male protrusion 603 and 605 and each corresponding female receptacle 606 and 604 are connected via a tongue and groove mechanism, respectively, which is described in more detail hereafter.

As described hereinabove with reference to FIGS. 3 and 4, the outer race 402 further comprises a lock and alignment pin 120 that aligns the outer race 402 with the engine block 100. In this regard, the lock pin 120 preferably aligns with a corresponding recess 381 (FIG. 3) in the engine block 100. Furthermore, the outer race 402, because it is locked and aligned with the engine block 100 remains substantially stationary with respect to the engine block 100. Furthermore, the pin 120 may interface with an oil galley 400 (FIG. 4) as described here.

Note that the inner race 401 and outer race 402 are preferably comprised of a durable metal and/or alloy such as, for example, titanium and/or steel.

FIG. 7A depicts a cross-sectional view of the main bearing 107 as depicted in FIG. 4. However, such main bearing 107 is in an installed state. An "installed state" refers to a state when the inner race 401 and the outer race 402 are assembled and engaged with the crankshaft 104 (FIG. 2). In this regard, the rollers 700 are positioned on the inner race 401, and the outer race 401 is installed about the rollers 700 and the inner race 401.

As shown, when the inner race 401 and the outer race 402 are in the installed position, a channel 408 is created in which the rollers 700 are movably enclosed within the channel 408. The channel 408 is created by the inner race land surface 702 and the outer race land surface 701. Note that the land surface is that surface on which the rollers 700 travel, which is described further herein.

Note that where the inner race 401 and the outer race 402 meet there is an oil gap 811 through which oil can spill as the rollers 700 travel through the channel 408. The oil gap 811 may comprise a seal (not shown) that allows the oil to ooze out of the gap 811. The oil gap 811 is described further herein.

Note that in order to install the main bearing 107, the inner race 401 is assembled about the main journal 104 via the lock and alignment pin 123. In this regard, the recess 121 in the main journal 104 receives the lock and alignment pin 123.

An adhesive lubricant, such as, for example petroleum jelly, might be placed on the inner race land surface 702 after the inner race 401 has been assembled and attached to the main journal 104 via the lock pin 123 and the recess 121 (FIG. 1) in the main journal 104 (FIG. 1). The rollers 700 are then adhered to the outside inner race land surface 702 via the petroleum jelly.

Note that the rollers 700 may be of any type of roller known in the art. For example, separate rollers may be installed about the inner race 401. However, roller cages (not shown) may be used in the bearing 107. In this regard, a roller cage is a plurality of rollers 700 connected together via a wire or other flexible material. Thus, when installing, a user may wrap the cage around the inner race 401 and connect the cage end-to-end to encircle the inner race 401, such as is known to those skilled in the art.

Once the rollers 700 are adhered to the inner race land surface 702, the outer race 402 is installed. Much like the installation of the inner race 401, the two pieces 601 and 602 are assembled around the rollers 700.

FIG. 7B depicts a cross-sectional view of the rod bearing 207 as depicted in FIG. 2. However, such rod bearing 207 is in an installed state, as described hereinabove with reference to FIG. 7A.

As shown, when the inner race 403 and the outer race 404 are in the installed position, a channel 408 is created in which the rollers 700 are movably enclosed within the channel 408. Thus, the rod bearing 207 operates substantially similar to the main bearing 107 (FIG. 7A).

As described hereinabove with respect to the main bearing 107, the rod bearing 207 is also installed substantially similar. However, the main bearing 207 engages directly with the piston 200 (FIG. 2). Thus, at the joints 1400 on the rod bearings 207, these joints 1400 form the weakest link in the diameter of the bearing 207. Thus, it is preferable that the lock and alignment pins 230 and 231 are aligned one with the other, as illustrated by the hatched reference line 813.

In order to offset the force of the pistons 200 (FIG. 2) as they combust to form rotary motion in the crankshaft 101, it is preferable that the joints 1400 be at an angle sufficiently removed from the lock and alignment pins 230 and 231. In this regard, if the lock and alignment pins 230 and 231 are sufficiently far from the joints 1400, then the mechanical stress caused by the pistons 200 can be absorbed where the pins 230 and 231 are located. As an example, with reference to the reference line 813, the joints 1400 are preferably approximately forty-five degrees removed from the pins 230 and 231. Note that forty-five degrees is used as an exemplary value, and other values may be used in other embodiments.

Figure 8:
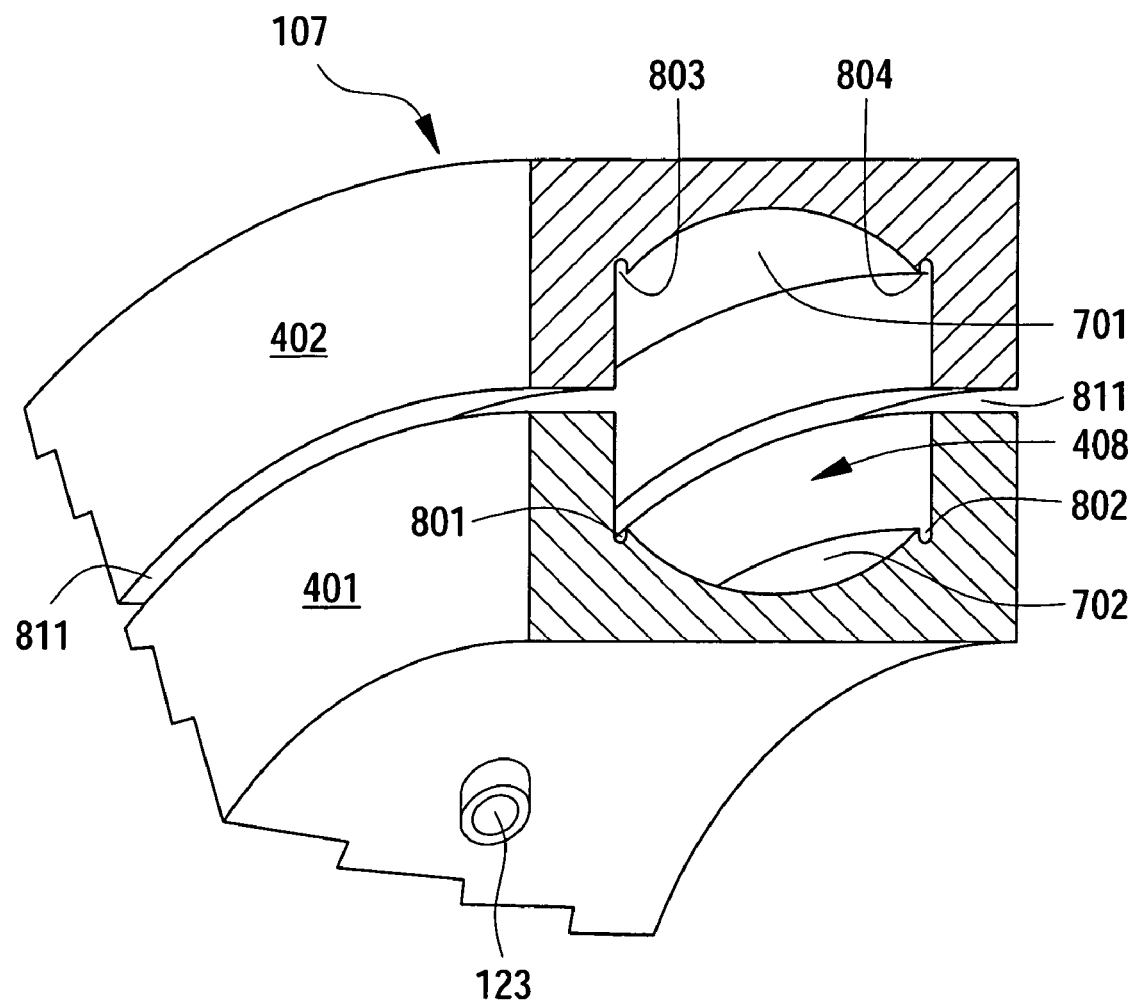
FIG. 8 is a cross sectional perspective view of an assembled main bearing as depicted in FIG. 4.

FIG. 8 depicts a perspective cross-sectional view of the main bearing 107 of FIG. 7. The main bearing 107 comprises the inner race 401, which engages the outer race 402 through a plurality of rollers 700 (FIG. 7), as described hereinabove. Further, each of the races 401 and 402 comprise a plurality of oil canals 801-804. The oil canals 801-804 provide for spillover for the oil that is contained within the channel 408 that is provided via an oil inlet 800 as the rollers 700 travel through the channel 408. Furthermore, if a roller bearing cage is used, as described hereinabove, the canals 801-804 may be used to lock in the cage. In this regard, the cage (not shown) may comprise protrusions that can be forced into the canals 801-804 to retain the cage.

The oil gap 811 where the inner race 401 and the outer race 402 come together can be adjusted in accordance with an oil pressure mandated by the corresponding engine requirements. In this regard, the gap 811 provides an outlet for oil spillage in order to regulate the oil pressure in accordance with factory specifications related to pressure requirements.

Figure 9:
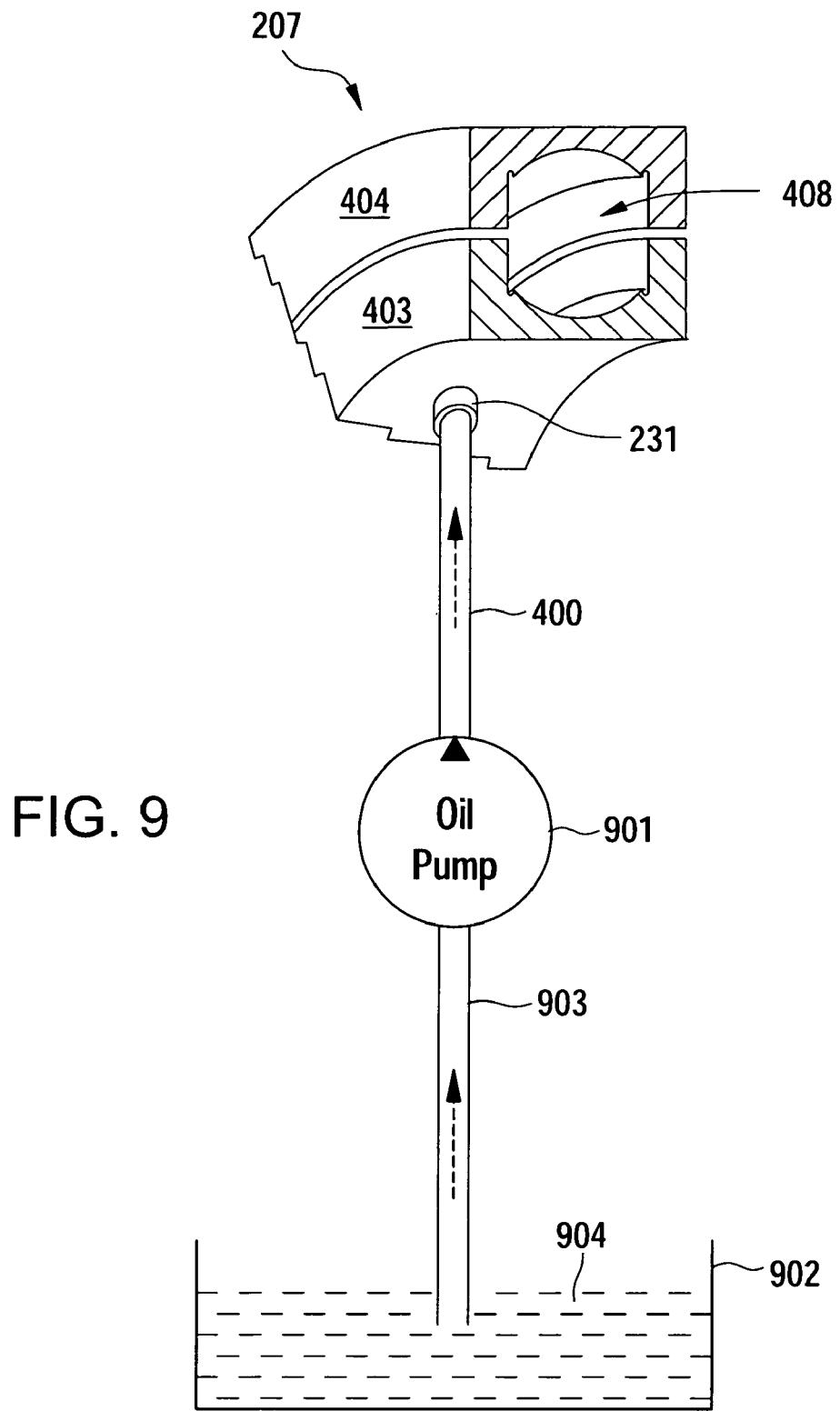
FIG. 9 is a block diagram depicting a rudimentary oil system in conjunction with a main bearing depicted in FIG. 4 in accordance with an embodiment of the present disclosure.

FIG. 9 depicts an embodiment of the inner race 401 of the rod bearing 207 of the present disclosure. In this regard, during normal operation, the oil inlet 800 (FIG. 8) is attached to the lock and alignment pin 231, as described hereinabove. Further, as noted herein the oil travels through the crankshaft 101 in oil galleys 400 (FIG. 4), and the lock and alignment pin 231 engages the oil galley 400 via the oil inlet and allows oil to enter the bearing 207 through an opening in the lock and alignment pin 231.

Note that the main bearing 107 behaves substantially similar to the rod bearing 207 in this respect, except that the lock and alignment pin 120 through which oil travels comes in through the engine block 100 (FIG. 1) into the top of the bearing 107.

The oil pump 901 is attached to an oil pan 902 via tubing and/or piping 903. The oil pump 901 pumps the oil 904 within the pan 902 to the oil galley 400 in the crankshaft 101 or the engine block 100. The rod bearing 207 receives the oil from the galley 400 in order to lubricate the rod bearing 207.

If during operation, the oil pump 901 fails, the rod bearing 207 of the present invention continues to obtain oil 904 via an inherent suction caused by the rod bearing 207. In this regard, as the rollers 700 travel through the channel 408, the movement of the rollers 700 one after the other within the already present oil 904 causes a suction property within the channel 408. Thus, so long as the rollers 700 continue to move within the channel 408, oil 904 from the oil pan 902 will continue to move through the tubing 903 through the oil pump 901 and to the rod bearing 207 through the galley 400. Likewise, the main bearing 107 continues to obtain oil 904 via an inherent suction caused by the main bearing 107.

FIGS. 10-13 depicts an exemplary roller 700 as depicted in FIG. 7. FIG. 10 depicts a side plan view of the roller 700. The roller 700 is substantially cylindrical having flat surfaces 1002 and 1003. Further, the roller land surface 1000 is rounded such that it rolls through the channel 408 (FIG. 4). FIG. 11 shows a top plan view of the roller 700. As shown, the roller 700 comprises flat surfaces 1002 and 1003.

Note that the size of the rollers is such that the roller 700 may appear to be "football-shaped." Thus, the sides 1002 and 1003 may be relatively short in width compared to the length of the roller 700.

FIG. 12 shows a side plan view of the first flattened end 1002. FIG. 13 is another side plan view of the second flattened end 1003. Such flattened ends 1002 and 1003 ensure that the roller 700 first snugly within the channel 408. Further, the roller 700 comprises the flat ends 1002 and 1003 in order to inhibit side torque forces and minimize such forces to protect the joints 1400 (FIG. 7).

Figure 14:
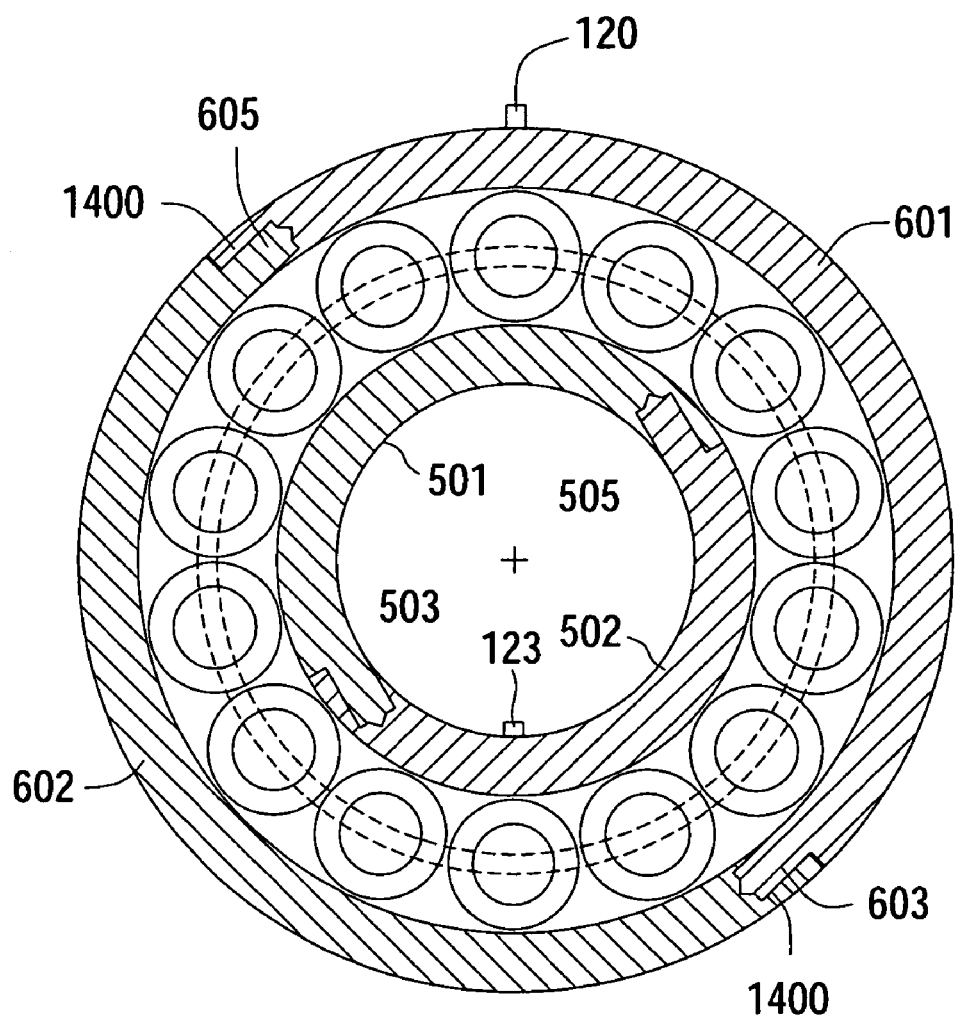
FIG. 14 depicts a cross sectional plan view of the main bearing depicted in FIG. 4.

FIG. 14 depicts a cross-sectional view of an assembled main bearing 107. As described herein, sections 501 and 502 are connected via a tongue and groove mechanism, and sections 601 and 602 are connected via a tongue and groove mechanism. The sections are joined by a male protrusion 503, 505, 605, or 606 being inserted into corresponding female receptacles 506, 504, 604, or 606, as described with reference to FIGS. 5 and 6, respectively. Where the male protrusions and the corresponding female receptacles meet are referred to as the joints 1400, as described hereinabove.

Figure 15:
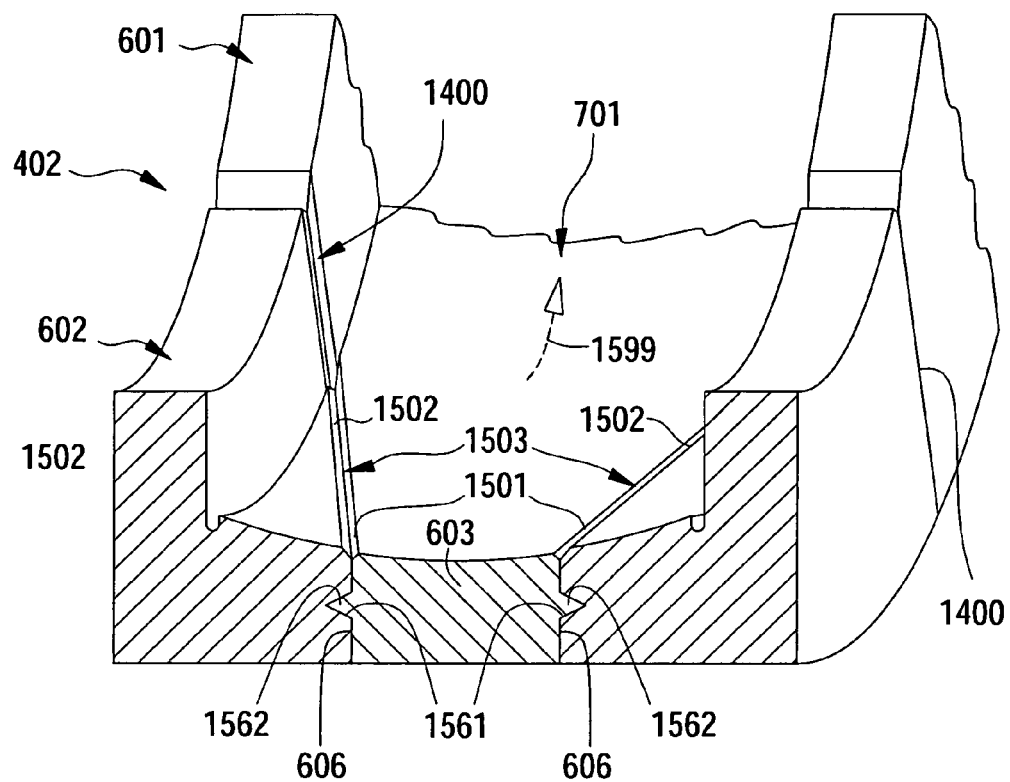
FIG. 15 depicts a cross sectional perspective view at a joint of an outer race of the main bearing depicted in FIG. 4.

FIG. 15 depicts a cross-sectional view of a portion of the outer race 402 at the joint 1400 in FIG. 14. The cross-sectional view is taken across the mating area of the male protrusion 603 and the female receptacle 606 (FIG. 6) when the male protrusion 603 and the female receptacle 606 are mated.

As described herein, the outer race 402 comprises two separable sections 601 and 602 that are attached together by inserting the male protrusions 603 in the female receptacle 606. As noted, FIG. 15 shows the sections mated. Note that the male protrusion 603 and the female receptacle 606 are fly-cut, respectively fly cuts 1501 and 1502. Such fly-cuts 1501 and 1502, when formed at the joint 1400 create a v-shaped notch channel 1503 when the male protrusion 603 is substantially fully inserted into the female receptacle 606. The v-shaped notch channel 1503 provides for a pathway for oil flow through the v-shaped notch channel 1503 as the rollers 700 travel through the channel 408. Such will be described further herein.

The male protrusion 603 is preferably v-shaped and comprises a v-shaped tongue 1562 located on either side of the protrusion 603. The v-shaped tongue 1562 preferably runs along the entire inserting edge of the v-shaped protrusion 603, which shall be described further herein.

Complimentarily, the female receptacle 606 is preferably v-shaped for receiving the v-shaped male protrusion 603. In this regard, the female receptacle 606 comprises a v-shaped groove 1561 that runs along the inside of the receptacle 606 for receiving the v-shaped tongue 1562 of the male protrusion 603. The complementary relationship of the tongue 1562 of the male protrusion 602 and the groove 1561 of the receptacle 606 decreases and/or eliminates lateral and radial movement between the sections 601 and 602 when the main bearing 107 is in use.

As described hereinabove, the outer race 402 comprises an outer race land surface 701. In one embodiment, a portion of the section of the outer race land surface 701 corresponding to the v-shaped male protrusion 603 is slightly lower than the portion of the outer race land surface 701 corresponding to the female receptacle 606, which is described further herein.

Therefore, a roller 700 travels through the channel 408 in a direction indicated by reference arrow 1599. As the roller 700 is traveling through the channel 408 formed by the outer race land surface 701 and the inner race land surface 702 (FIG. 8), the surface area of the roller 700 does not contact the male protrusion 603 until the roller passes 25% of the male protrusion 603 when the roller initially contacts that portion of the land surface 701 making up the female receptacle 606.

Figure 16:
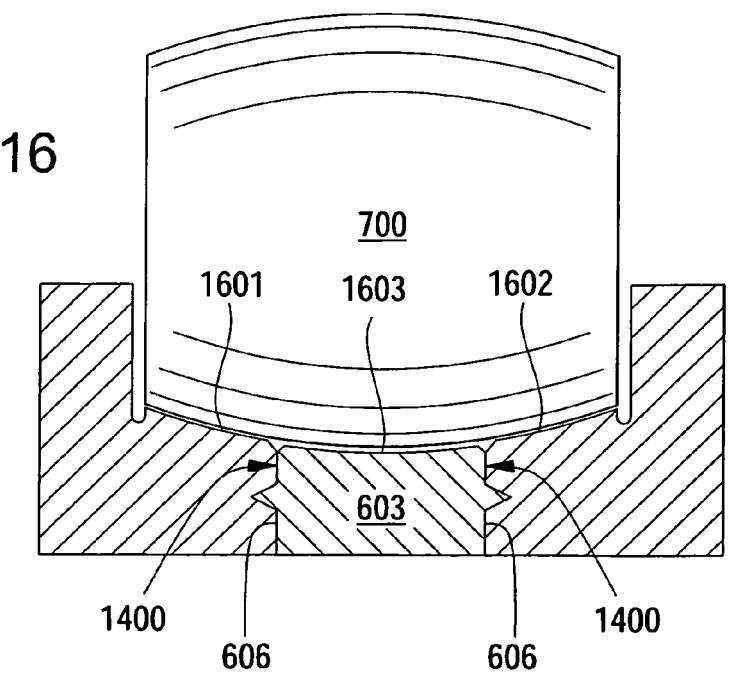
FIG. 16 depicts a cross sectional plan view of a portion of an outer race of the main bearing depicted in FIG. 4.

In this regard, FIG. 16 illustrates the roller 700 as the roller 700 travels over the joint 1400. Notably, the land surface 1601 and 1602 associated with the female receptacle 606 is slightly raised with respect to the land surface 1603 associated with the male protrusion 603. Thus, as shown, as the roller 700 initially travels over the joint 1400, the roller 700 is not contacting the surface 1603 at least as the roller 700 first travels across the joint 1400.

Therefore, as the roller 700 travels over joint 1400, only a portion of the surface of the roller 700 is in contact with the sections 1601 and 1602. Therefore, no prohibitive contact is made where the joint 1400 is created by the meeting of the protrusion 603 and the receptacle 606 initially. In this regard, the roller 700 preferably moves in a direction such that it moves across the joint 1400 from the female receptacle 606 to the male protrusion 603.

In one embodiment, the male protrusion 603 has a slight grade as described further herein. The beginning of the male protrusion 603, i.e., at the point, the male protrusion 603 sits slightly below the female receptacle. However, the male protrusion 603 inclines in such a manner as to even out the land surfaces of the male protrusion 603 and the female protrusion 606. Preferably, at approximately 25% of the male protrusion, the female receptacle 606 is no longer elevated with respect to the male protrusion 603.

Figure 17:
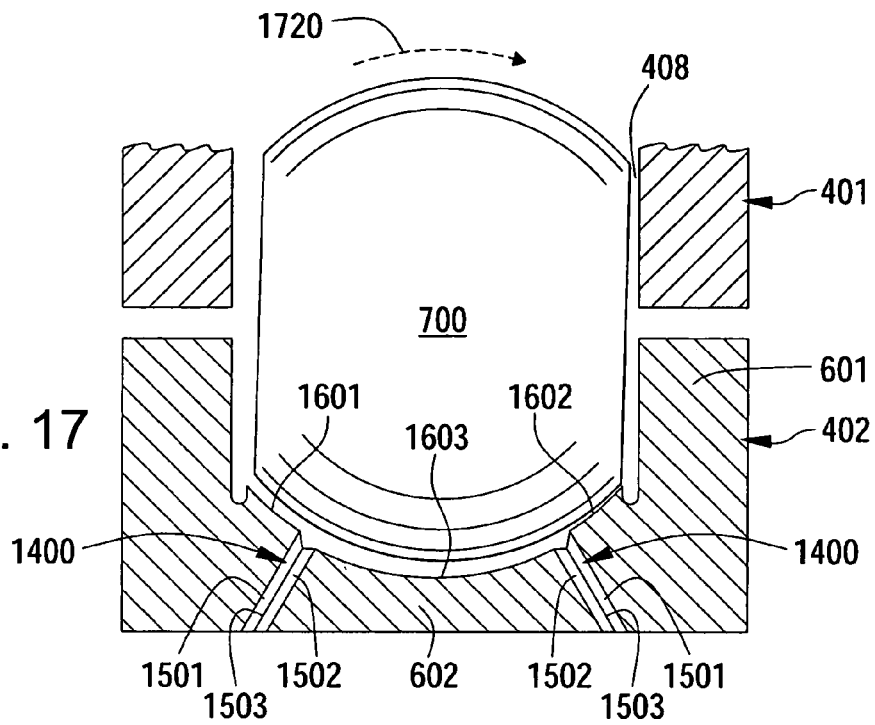
FIG. 17 depicts a cross sectional plan view of a portion of an inner and/or outer race of the main bearing depicted in FIG. 4 as a roller moves through a chamber of the main bearing.
Figure 18:
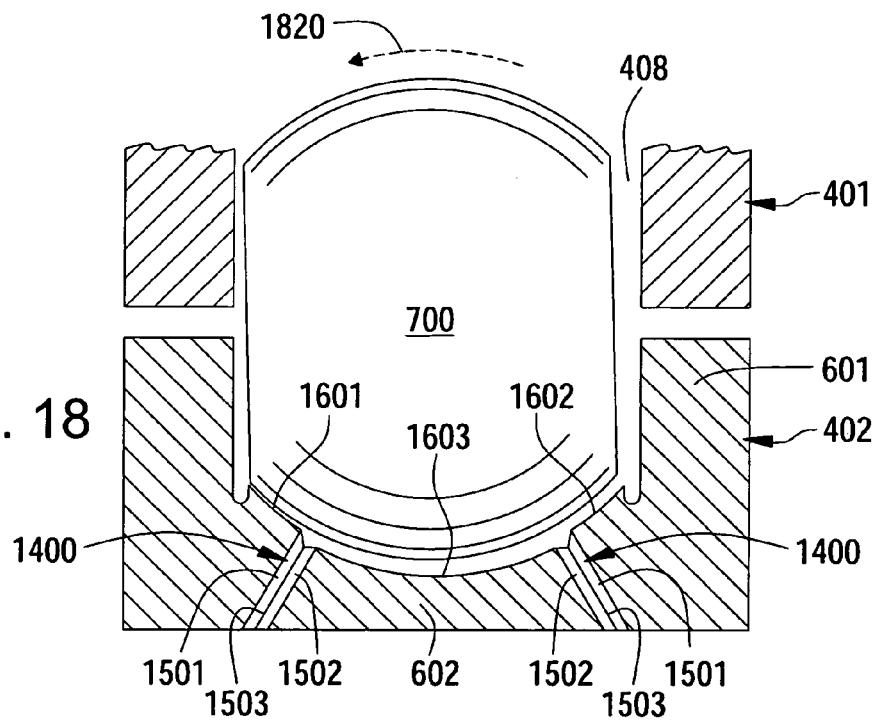
FIG. 18 depicts a cross sectional plan view of a portion of an inner and/or outer race of the main bearing depicted in FIG. 4 as a roller moves through a chamber of the main bearing.

FIG. 17 and FIG. 18 show a roller 700 as it travels through the channel 408. As shown in FIG. 17, even if considerable torque forces, for example, cause the roller 700 to tilt within the channel 408, the channel 408 is such that the surface area of the roller 700 does not contact that section 1603 of the race land surface 701 corresponding to the male protrusion 603 (FIG. 15), thus reducing and/or eliminating the risk that at the joint 1400 the connection between the two sections 601 and 602 will cause damage to the main bearing 107. In this regard, the female receptacle 606 serves as a ramp to launch the roller 700 onto the male protrusion 603 such that minimal surface area of the roller 700 will contact the land surface 701 of the outer race 402 as it travels over the joint 1400.

With further reference to FIG. 18, the v-notch channel 1503 comprised of the fly cuts edges 1501 and 1502 of the protrusion 603 and the receptacle 606 create a movement channel for the oil to filter into when the roller 700 passes by the joint 1400. Such oil collection further serves to lift and/or float the roller (700) in the channel 408 as the roller 700 moves through the outer race 402. Therefore, friction is reduced considerably, if not almost eliminated, at the joint 1400.

Figure 19:
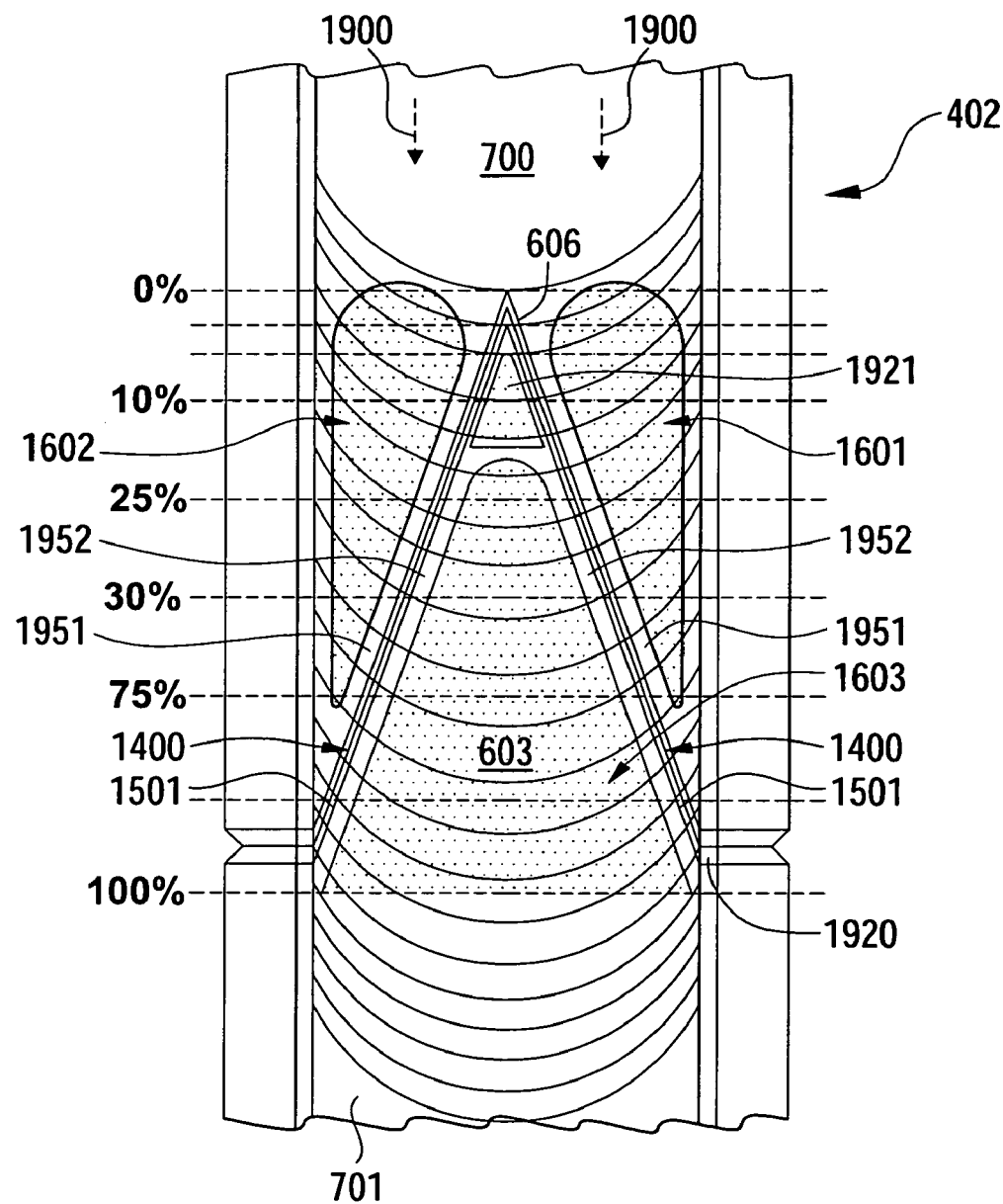
FIG. 19 depicts a top plan view of an inner race of the main bearing depicted in FIG. 4.

FIG. 19 further illustrates the relationship of the land surface 701 with respect to the male protrusion 603 and the female receptacle 606 and how the interplay between the difference in the land surface height of each ensures that the bearing 107 works properly.

FIG. 19 is a plan view of the outer race 402 depicting the outer land surface 701. The land surface 701 comprises the male land section 603 and the female land sections 1601 and 1602, as described hereinabove. Preferably, the male land section 1603 is slightly lower than the female sections 1601 and 1602. Therefore, as the roller 700 moves in the direction of reference arrows 1900, it moves from the female land sections 1601 and 1602 of the land 701 to the male section 1603 of the land 701. Thus, the contact made between the roller 700 and the land 701 is not constant.

The difference in the height of the female land sections 1601 and 1602 and the male land section 1603 is such that a transition by the roller 700 is made over the joint 1400 without interference by an obstruction.

As an example, the roller 700 shown in FIG. 19 begins interfacing with the joint 1400 at the 0% hatched line. 0% indicates that the land surface of the roller 700 has not yet reached the male protrusion 603. Further, as 0% the male land surface 1603 is slightly lower than the female land surfaces 1601 and 1602. When the roller 700 reaches the 25% hatched line, the roller 700 is contacting 25% of the male land surface 1603. At the 100% hatch line, the roller 700 undergoes a transition from the female land surfaces 1601 and 1602 to the land surface 701.

In this regard, when the roller 700 moves from 0% to 100%, contact is as follows. At 0%, the roller 700 is contacting the entire width of the land 701. However, as it begins to move onto the male protrusion 603 and over the male land surface 1603, the portion of the roller 700 that is aligned with the land surface 1603 of the male protrusion 1603 is not touching the male land surface 1603, because such surface 1603 is slightly lower that the female sections 1601 and 1602. In effect, the higher female land surfaces 1601 and 1602 effectively lift the roller 700 off the male land surface 1603.

However, the male land surface 1603 further has a very slight grade from Point 0% to approximately 20%. In this regard, a part of the surface 1921 begins sloping so that the male land surface 1603 at approximately 20% is substantially level with the female land surfaces 1601 and 1602.

Therefore, as the roller 700 rolls over the male land surface 1603, a greater and greater portion of the roller 700 is touching the male land surface land 1603. However, such transition to the greater contact of the roller 700 and the male land surface 1603 does not affect the movement of the roller 700 and thus the operation of the bearing 107.

In this regard, the slight difference in height between the male land surface 1603 and the female land surfaces 1601 and 1602 ensures that the roller 700 does not hit an obstruction, e.g., the joint 1400. In addition, the male protrusion 603 may further comprise a beveled edge 1952 and the female receptacle 606 may further comprise a beveled edge 1951. The beveled edges 1951 and 1952 may extend along the edge of the fly cuts that makes up the v-notch channel 1503.

In this regard, as the roller 700 moves from the female land surfaces 1601 and 1602 to the male land surface 1603, the transition may be buttressed by the slight grade so that any obstruction does not interfere with the movement of the roller 700 over the land 701.

Notably, when the roller 700 first begins its transition over the joint 1400, none of the roller is touching the male land surface 1603. As the roller 700 travels, more and more of the surface area of the roller 700 contacts the male land section 1603 and less contacts the female land surfaces 1601 and 1602.

Note that variances in the land surface 701 by beveling of the edges of the joint 1400 may be effectuated in order to reduce the possibility of damage of the bearing 107 as the roller 700 passes over the joint 1400.

Figure 20:
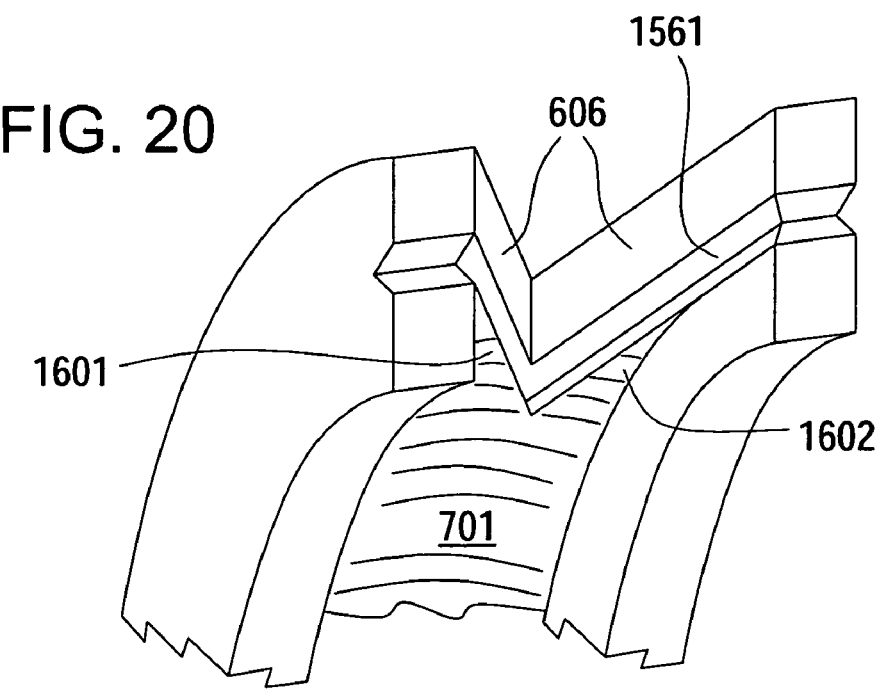
FIG. 20 depicts a perspective view of a female receptacle of the main bearing depicted in FIG. 4.
Figure 21:
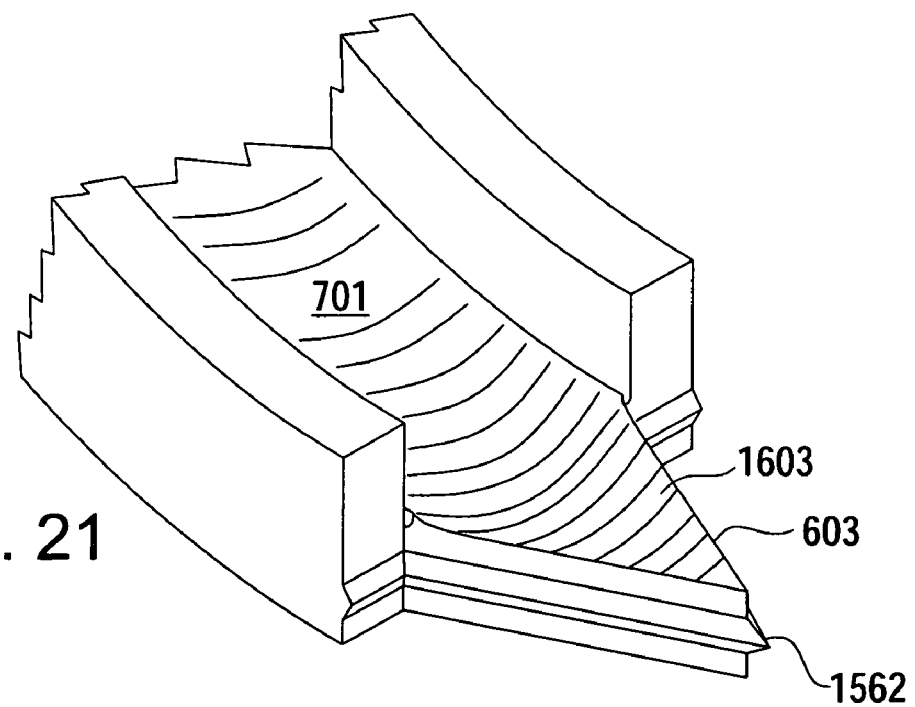
FIG. 21 depicts a perspective view of a male protrusion of the main bearing depicted in FIG. 4.

FIGS. 20 and 21 further illustrate the v-shaped tongue and groove attachment for connecting the sections 601 and 602 of the outer race 402. FIG. 20 shows the female receptacle 606 comprising the v-shaped groove 1561. Further, FIG. 20 shows those sections 1601 and 1602 of the land surface 701 that serve to launch the roller onto the male land surface 1603 (FIG. 19). As noted herein, the male land surface 1603 is slightly lower than the female land surfaces 1601 and 1602. Thus, contact between the land 701 and the roller 700 is reduced significantly, which in turn reduces friction significantly and the possibility of damage that could be caused by the roller 700 hitting an obstruction, e.g., a protruding male protrusion 603, as the roller 700 passes over the joint 1400 (FIG. 14).

FIG. 21 illustrates the male protrusion 603 comprising the tongue 1562 that fits within the groove 1561 (FIG. 20) of the female receptacle 606 when the male protrusion 603 is inserted within the female receptacle 606. As described herein, the male land surface 1603 of land surface 701 sits slightly lower, i.e., it is slightly recessed, than the female sections 1601 and 1602 of the land 701. Therefore, when the roller 700 passes over the joint 1400 (FIG. 14) where the male protrusion 603 and the female receptacle 606 join, then damage to the bearing is minimized due to decreasing contact of the roller 700 with an obstruction, e.g., a protruding male protrusion 603.

Figure 22:
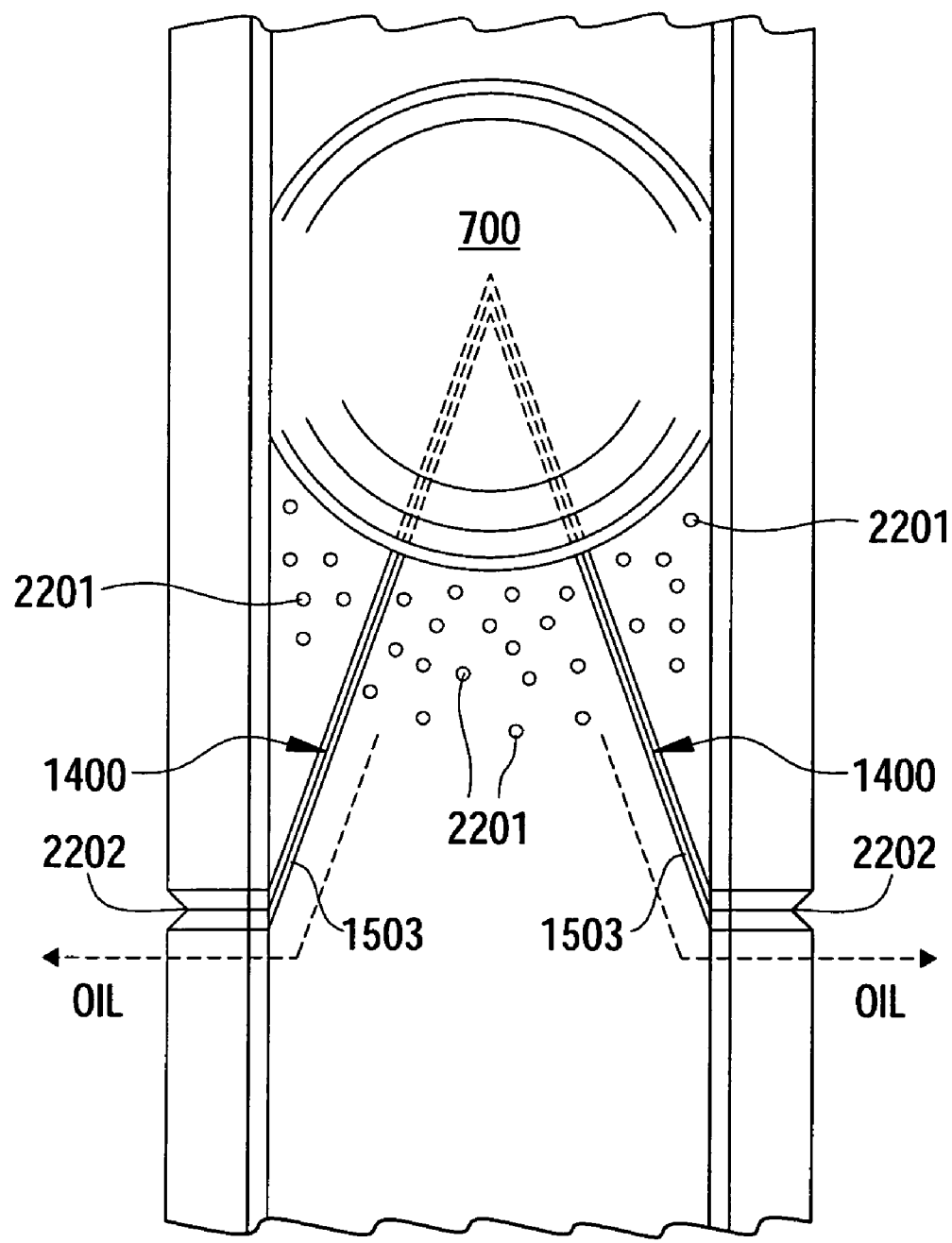
FIG. 22 depicts a top plan view of an inner and/or outer race of the main bearing depicted in FIG. 4 as a roller moves through the channel.

FIG. 22 depicts a roller 700 as it travels through the channel 408 as it passes by a joint 1400 in a race 401 or 402. As indicated, the roller 700 will push any oil 2201 that has been injected into the channel 408 to the oil v-notch channel 1503. Furthermore, oil 2201 will be pushed through the v-shaped channel 1503 and out the v-notches 2202.

FIG. 23 illustrates a perspective view of a main bearing 107. In this regard, FIG. 23 depicts the assembled outer race 402 comprising the lock and alignment pin 120 that locks and aligns the main bearing to the bearing cap 105 (FIG. 1). Furthermore, FIG. 23 depicts the inner race 401 engaged with the outer race 402. Notably, when the inner race 401 and the outer race 402 are engaged, the oil gap 811 allows oil to escape from the channel 408 (FIG. 4) when the rollers 700 (FIG. 7) travel through the channel 408. The inner race 401 comprises the lock and alignment pin 123 that engages the main journal 104 (FIG. 1). As noted herein, the aforedescribed is related to a main bearing 107, however, the rod bearings 207 are substantially similar to the main bearing 107.

Note that, with respect to the rod bearing 207, the lock and alignment pin 230 (FIG. 2) ensures that the outer race 404 is aligned and locked with the connecting rod 201 when the piston 100 (FIG. 2) actuates the connecting rod 201 (FIG. 2). In this regard, it is important to note that a variety of forces are acting upon the bearing 207. When the piston 200 is actuated, i.e., the engine fires, a strong force is applied through the rod 201. The bearing 207 comprises mechanical weakness along the joints 1400, because the pieces of the races 403 and 404 are attached at those joints 1400. Therefore, it is important to the note that the bearing 207 is not in direct alignment with the rod 201 when the engine fires.

Thus, the alignment and lock pins 230 (FIG. 2) and 231 (FIG. 2) preferably are positioned in accordance with the timing of the firing of the engine such that mechanical weaknesses are not fully exploited during operation. Preferably, the lock and alignment pins 230 and 231 are positioned such that they are 45° left or right of center and in opposition, as described herein. In this regard, if pin 230 were positioned 45° left of center, pin 231 would be positioned 45° right of center. Of course, such angles are approximations only, and such values can vary depending upon the application and the mechanical makeup and such of the bearing 207.

FIG. 24 depicts a cross-sectional view of the main bearing 107. As shown, the outer race 402 and the inner race 401 are engaged to form a channel 408, as described herein. The rollers 700 travel through the channel 408. As described hereinabove, the rollers 700 may comprise any type of roller know in the art for use in a roller bearing. For example, the roller 700 may comprise a plurality of rollers attached together to form a roller cage, as described herein.

FIG. 25 depicts a perspective view of a section 602 of the outer race 402. Notably, a roller 700 (FIG. 29) travels over the land surface 701 in the direction of reference arrow 3001. In this regard, the roller 700 would travel through the channel 408 formed by the land surface 701 from the female receptacle 606 to the male protrusion 603 (FIG. 6) of section 601.

FIG. 26 depicts a perspective view of a section 502 of the inner race 401. Notably, a roller 700 (FIG. 29) travels over the land surface 701 in the direction of reference arrow 3101. In this regard, the roller 700 would travel through the channel 408 formed by the land surface 702 from the female receptacle 506 to the male protrusion 503 (FIG. 5) of section 501.

Figure 27:
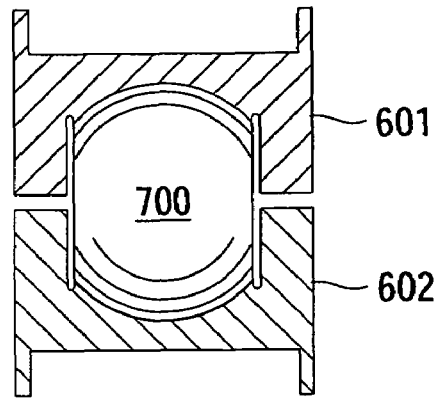
FIG. 27 depicts a cross sectional plan view of a single roller moving through the channel of the main bearing as depicted in FIG. 23.
Figure 28:
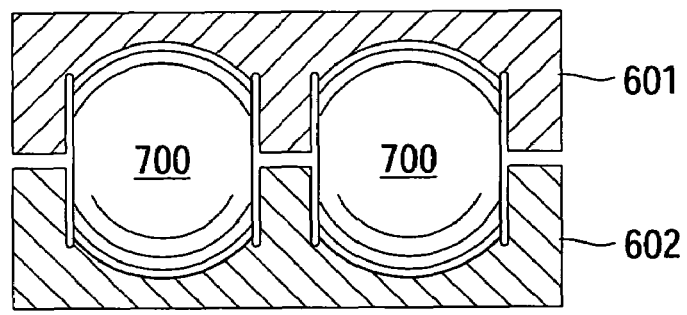
FIG. 28 depicts a cross sectional plan view of a double roller moving through the channel of the main bearing as depicted in FIG. 23.
Figure 29:
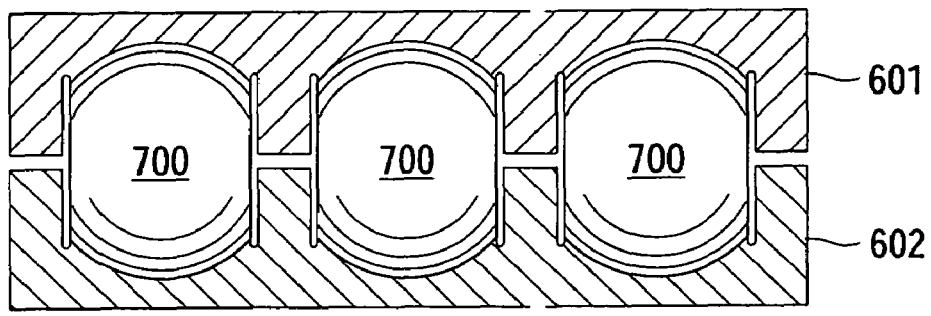
FIG. 29 depicts a cross sectional plan view of a triple roller moving through the channel of the main bearing as depicted in FIG. 23.

FIGS. 27-29 depict other embodiments of rollers 700 that may be used in the present disclosure. In this regard, FIG. 27 depicts a cross section of the main bearing 107 wherein a single line of rollers 700 are used in the channel 408.

However, multiple lines of rollers 700 may be used in the channel 408. For example, two lines of rollers 700 may be used, as shown in FIG. 28, or three lines of rollers 700 may be used, as shown in FIG. 29.

Figure 30:
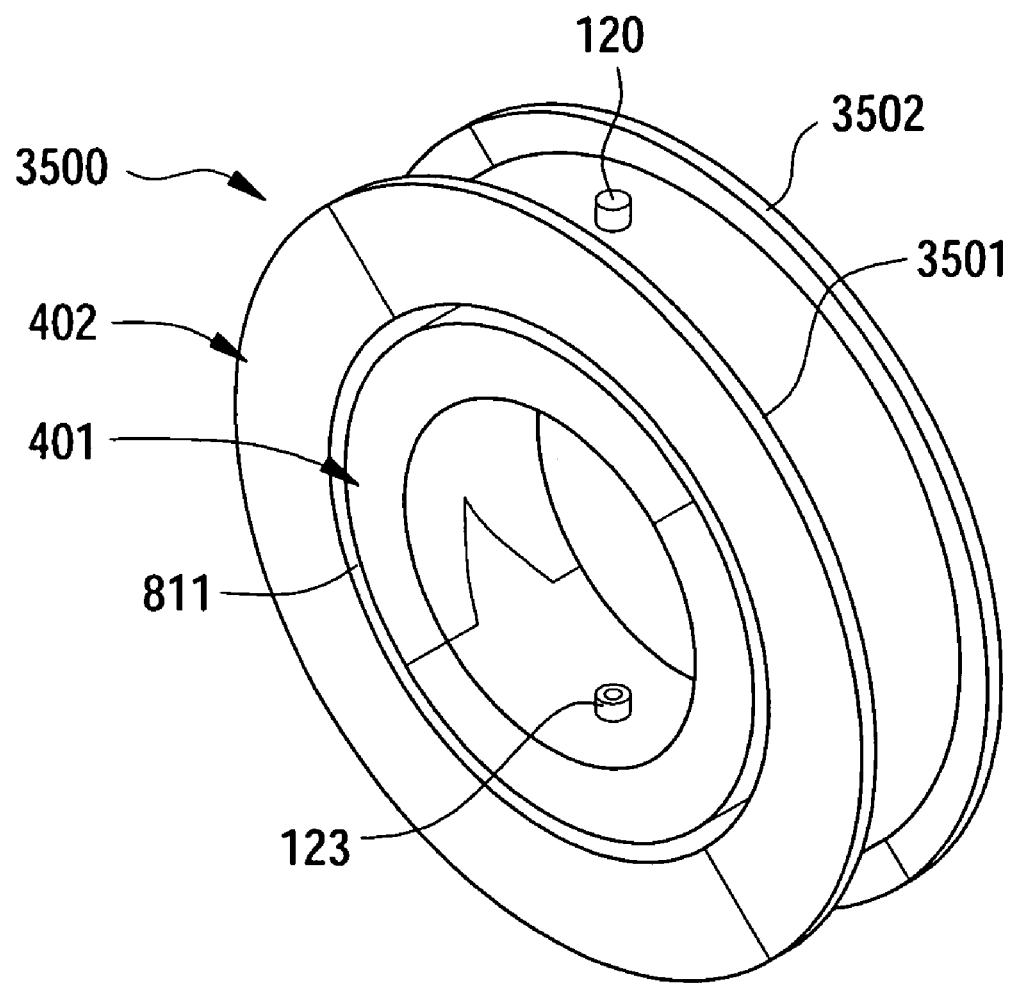
FIG. 30 depicts a perspective view of a thrust bearing in accordance with an embodiment of the present disclosure.

FIG. 30 depicts a thrust bearing 3500 in accordance with an embodiment of the present disclosure. The thrust bearing 3500 is substantially similar to the main bearing 107 (FIGS. 1-34) as described herein. However, the thrust bearing 3500 further comprises a plurality of lips 3501 and 3502.

Figure 31:
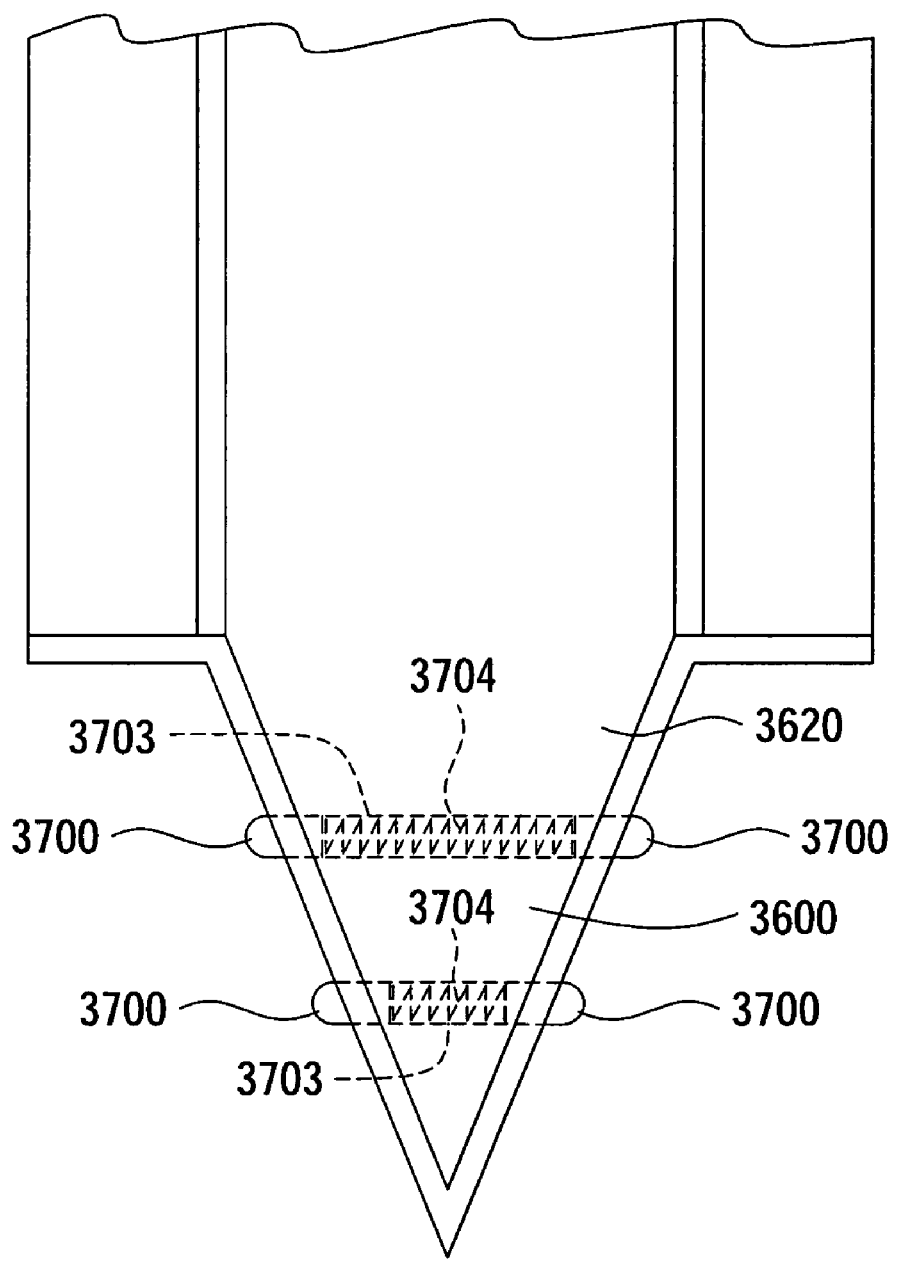
FIG. 31 depicts a perspective view of the male protrusion depicted in FIG. 31.

FIG. 31 depicts another embodiment of the bearing 107. In such an embodiment, the male protrusion 603 comprises a plurality of conduits 3703 that traverse the male protrusion 603. Each conduit 3703 comprises a spring 3704 interposed between pins 3700. The pins 3700 extend such that a portion of each pin sticks out from the male protrusion when no force is applied to them, i.e., when pins are not engaged.

In this regard, the pins 3700 are moveably attached to the spring 3704, such that the pins 3700 are spring-loaded. Thus, if force is applied to the pins 3700 in a direction toward the spring and the force is then released, the springs will return extending from the male protrusion 603.

Two conduits 3703 each comprising a spring 3704 and pins 3700 are illustrated in FIG. 31. However, such combination is for exemplary purposes only. Other numbers of conduits 3703, springs 3704, and pins 3700 may be used in other embodiments.

Figure 32:
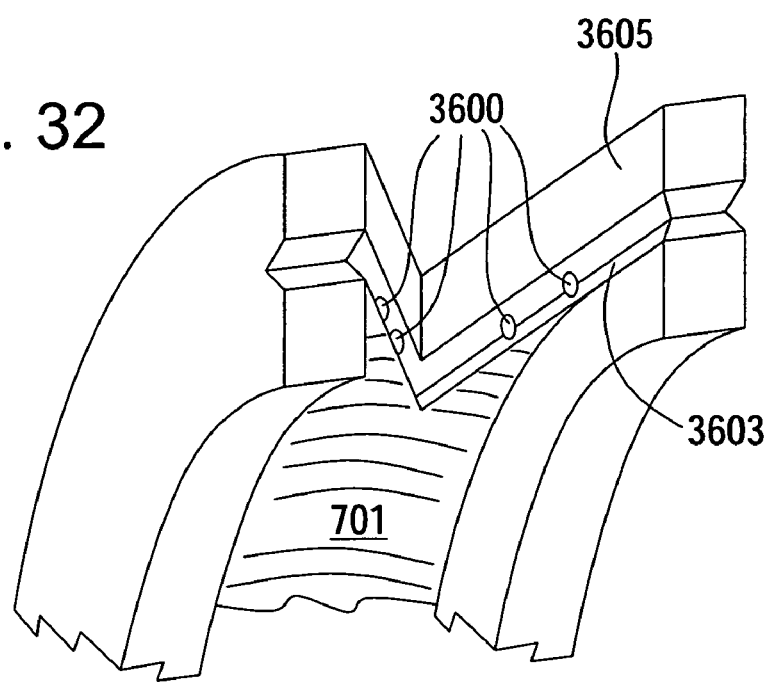
FIG. 32 depicts an embodiment of a male protrusion having lock pins in accordance with an embodiment of the present disclosure.

As an example, FIG. 32 depicts a perspective view of a female receptacle 3605 in accordance with an embodiment of the male protrusion of FIG. 31. In this regard, a v-notched channel 3603 comprises a plurality of openings 3600. Preferably, the number of openings 3600 corresponds to the number of pins 3700 (FIG. 31) to which the female receptacle 3605 attaches.

Thus, as the male protrusion 3620 (FIG. 31) is inserted into the female receptacle 3605, the pins 3700 (FIG. 31) depress against the v-notched channel 3603 so that the male protrusion 3620 can be inserted. In this regard, the pins 3700 push against the springs 3703 (FIG. 31). When the pins 3700 align with their corresponding openings 3600, the springs 3704 force the pins 3700 into the openings 3600 thereby locking the male protrusion 3620 (FIG. 31) and the female receptacle 3605 together.

Figure 33:
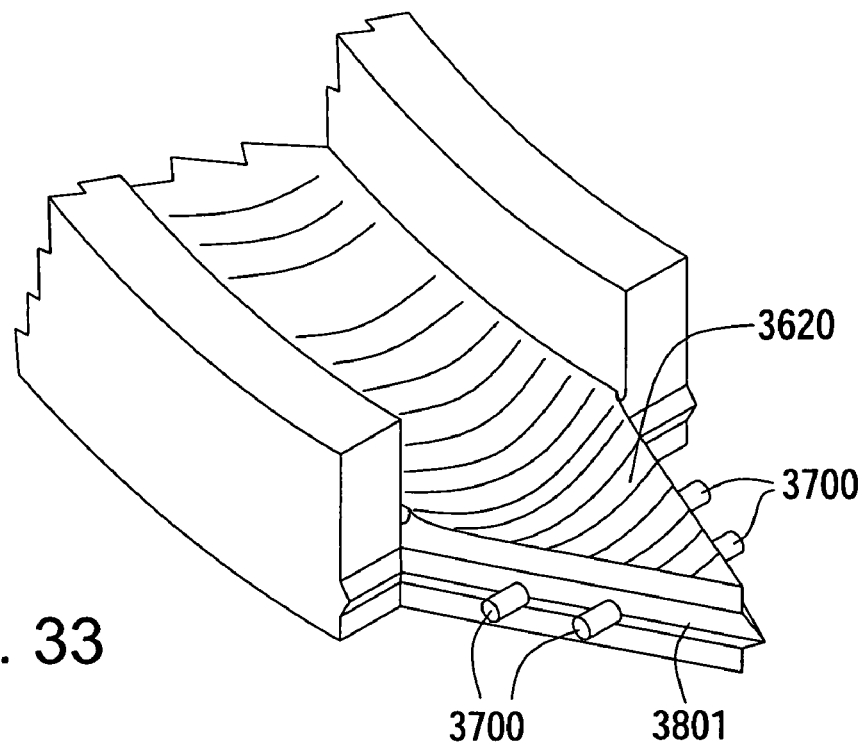
FIG. 33 depicts a perspective view of a corresponding female receptacle in accordance with an embodiment of the present disclosure for mating with the male protrusion depicted in FIG. 31.

FIG. 33 illustrates a perspective view of the male protrusion 3620 of FIG. 31. As shown, the pins 3700 protrude from a v-notch 3801. Note that the pins 3700 may comprise a recess or a protrusion (not shown) on their protruding ends, which will be described further herein.

Figure 34:
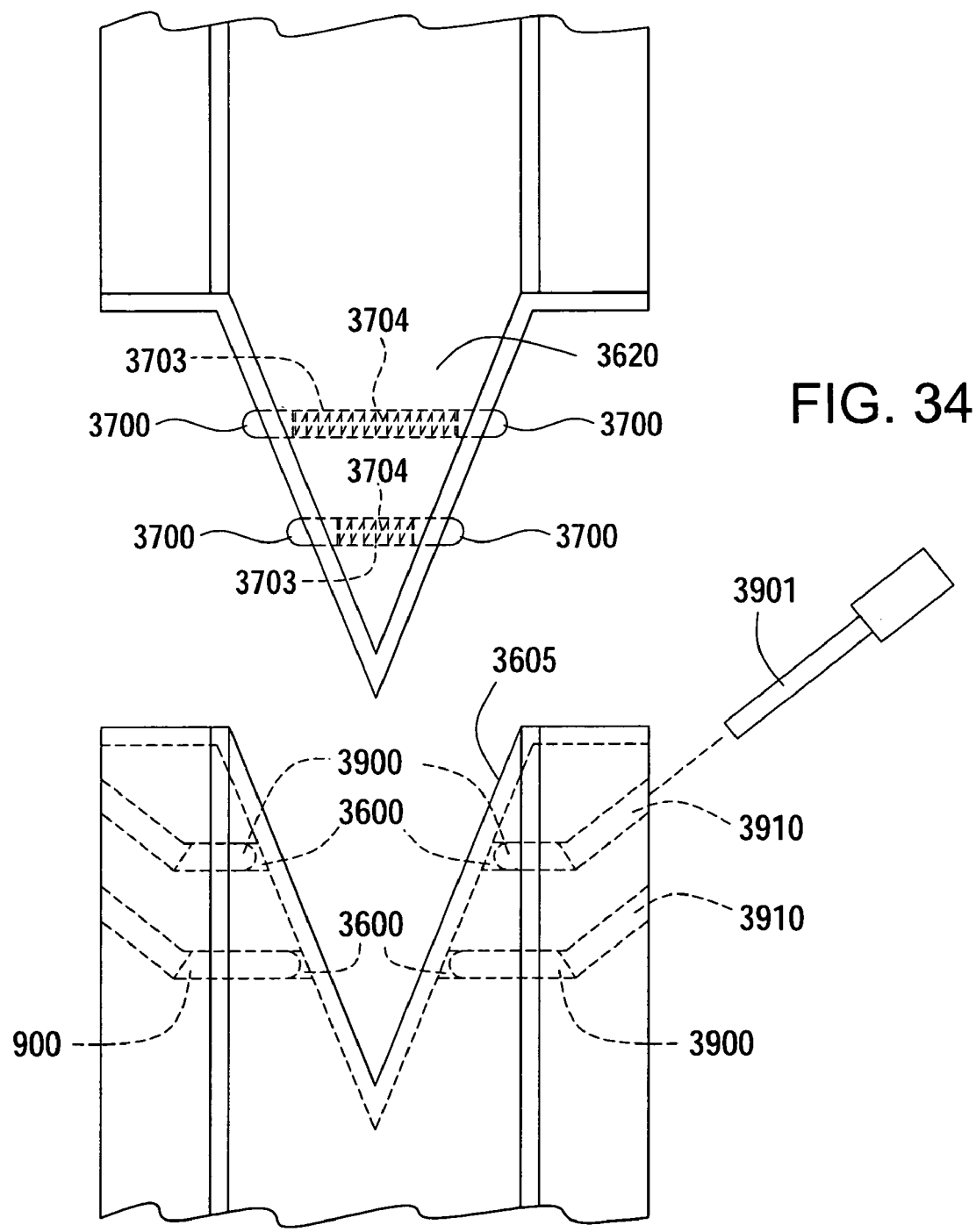
FIG. 34 is a plan view of a portion of the male protrusion depicted in FIG. 31 and a portion of the female receptacle depicted in FIG. 33.

FIG. 34 depicts a plan view of a portion of the male protrusion 3620 and the female receptacle 3605. The pins 3700 fit into the openings 3600 when the protrusion 3620 and the receptacle 3605 are mated. Once the pins 3700 are engaged with the openings 3600, a tool 3901, e.g., a drill bit or a screwdriver, may be inserted into an opening 3910 in the side of the main bearing 107 (FIG. 1) at an angle as shown. The tool 3910 may then be used to push release pins 3900 toward the pins 3700 until the lock pins 3900 engage the pins 3700. The release pins 3900 may have an angled end for contacting the tool 3910.

In this regard, the release pins 3900 contact the pins 3700 when the tool 3910 pushes on the end of the release pin 3900. The force applied to the pins 3700 by the release pin 3900 depresses the spring 3704, pushes the pin 3700 from the opening 3600, and releases the mated protrusion 603 and receptacle 606.

The male protrusion 3620 would comprise the pins 3700 that protruded into the opening 3600 in order to keep the male protrusion 3620 and the female receptacle 3605 locked together during use. When the pin 3900 is actuated via the opening 3910, it would move toward the pin 3700, which would actuate the spring-loaded pin 3700 via spring 3704. Such lock pin 3700 would ensure that the pieces remained together unless a user inserted the tool 3901 into the hole 3910.

The foregoing disclosed bearing provides a variety of advantages. Such advantages include that the two-piece inner race 401 and the two-piece outer race 402 are simple to install and change. Such easy installation and maintenance will provide cost-savings.

Furthermore, the roller bearing 107 will improve revolutions per minute (RPM) performance due to less power necessary to operate the engine. The bearing 107 used in vehicle engines will improve exhaust emissions by lowering the temperature due to actuating less load.

The invention claimed is:

1. A bearing, comprising:
    an inner race having separable inner sections, each inner section comprising an inner male protrusion and an inner female receptacle, each inner male protrusion mated with one of the inner female receptacles forming a unitary inner race;
    an outer race having separable outer sections, each outer section comprising an outer male protrusion and an outer female receptacle, each outer male protrusion mated with one of the outer female receptacles forming a unitary outer race; and
    a plurality of rollers situated within a channel formed by engaging the inner race and the outer race,
    wherein the inner race comprises an inner race pin for insertion into a recess formed on a crankshaft rod, the inner race pin located on an inside surface of the inner race.

2. The bearing of claim 1, wherein the inner male protrusions and the outer male protrusions are V-shaped.

3. The bearing of claim 2, wherein the inner female receptacles and the outer female receptacles are V-shaped.

4. The bearing of claim 3, wherein each male protrusion has a fly-cut edge and each female protrusion has a fly-cut edge such that when each male protrusion is mated with its corresponding female receptacle a v-shaped channel is formed in a land of each race.

5. The bearing of claim 3, wherein each male protrusion has a v-shaped tongue on a mating surface.

6. The bearing of claim 5, wherein each female protrusion has a v-shaped groove on a mating surface.

7. The bearing of claim 6, wherein when each male protrusion is mated with one of the female receptacles by engaging the v-shaped tongue of the male protrusion and the v-shaped groove of the female receptacle.

8. The bearing of claim 1, wherein at least one roller is substantially cylindrically shaped such that the roller fits within the channel.

9. The bearing of claim 1, wherein the outer race comprises an outer race pin for insertion into a recess formed on a bearing cap, the outer race pin located on an outside surface of the outer race.

10. The bearing of claim 9, wherein the inner race pin is aligned with the outer race pin such that the inner race pin is 45° from a centerline of the bearing and the outer race pin is 45° from the centerline of the bearing.

11. The bearing of claim 1, wherein each female protrusion comprises a female land surface and each male protrusion comprises a male land surface.

12. The bearing of claim 11, wherein the female land surface is slightly elevated with respect to the male land surface.

13. The bearing of claim 12, wherein the roller travels through the channel such that it travels from the female receptacle to the male protrusion.

* * * * *